(12) United States Patent
Bouazizi et al.

(10) Patent No.: US 11,785,290 B2
(45) Date of Patent: Oct. 10, 2023

(54) MEDIA ACCESS FUNCTION FOR SCENE DESCRIPTIONS

(71) Applicant: QUALCOMM Incorporated, San Diego, CA (US)

(72) Inventors: Imed Bouazizi, Frisco, TX (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/352,597

(22) Filed: Jun. 21, 2021

(65) Prior Publication Data

US 2021/0409818 A1    Dec. 30, 2021

Related U.S. Application Data

(60) Provisional application No. 63/043,491, filed on Jun. 24, 2020.

(51) Int. Cl.
| | |
|---|---|
| *H04N 21/44* | (2011.01) |
| *H04L 65/60* | (2022.01) |
| *G06F 9/54* | (2006.01) |
| *H04N 21/84* | (2011.01) |
| *H04N 21/462* | (2011.01) |

(52) U.S. Cl.
CPC ....... *H04N 21/44004* (2013.01); *G06F 9/541* (2013.01); *H04L 65/60* (2013.01); *H04N 21/4621* (2013.01); *H04N 21/84* (2013.01)

(58) Field of Classification Search
CPC ......... H04N 21/44004; H04N 21/4621; H04N 21/84; H04N 21/44012; H04N 21/47205; H04N 21/816; H04N 21/85406; H04N 21/8586; H04N 21/23412; H04L 65/1069; H04L 65/60; H04L 65/612; H04L 65/80; G06F 9/541
See application file for complete search history.

(56) References Cited

U.S. PATENT DOCUMENTS

2020/0366962 A1*  11/2020  Lim ................. H04N 21/44008
2021/0105451 A1*   4/2021  Oyman .................. H04L 65/65

OTHER PUBLICATIONS

"WD of Scene Description for MPEG Media", ISO/IEC JTC 1/SC 29/WG 11 N19070, Apr. 24, 2020 (Year: 2020).*

(Continued)

*Primary Examiner* — Caroline H Jahnige
(74) *Attorney, Agent, or Firm* — Polsinelli LLP

(57) ABSTRACT

Techniques are provided for processing media content. For example, a process can include using a scene description for to obtain media information and buffer information for a media object. The media information can identify an expected format for storing the media object in one or more output buffers of a media pipeline. The buffer information can include output buffer attributes. The process can include using the media information and the buffer information to initialize the media pipeline for the media object. The process can include obtaining the media object in a delivery format and generating one or more processed media objects. Each processed media object can be converted from the delivery format to the expected format for storing the processed media object in an output buffer. The process can include outputting the processed media object(s) to the output buffer(s) using the initialized media pipeline.

30 Claims, 12 Drawing Sheets

(56) References Cited

OTHER PUBLICATIONS

"Working Draft of Video Decoding Interface for Immersive Media", ISO/IEC JTC 1/SC 29/WG 11 N19068, Oct. 11, 2019 (Year: 2019).*
"MPEG-I Architectures", ISO/IEC JTC1/SC29/WG11/N18344, Mar. 2019 (Year: 2019).*
"Information Technology—Dyanmic Adaptive Streaming Over HTTP (Dash)—Part 3: Implementation Guidelines", ISO/IEC JTC 1/SC 29/WG 11, IOS/IEC PDTR 23009:3:2015, Oct. 20, 2015 (Year: 2015).*
Bouazizi I., et al., "[SD] Media Access Function", 131. MPEG Meeting, Jun. 29, 2020-Jul. 3, 2020, Online, (Motion Picture Expert Group or ISO/IEC JTC1/SC29/WG11), No. m54519, Jun. 24, 2020 (Jun. 24, 2020), XP030288946, 7 Pages, Retrieved from the Internet: URL: http://phenix.int-evry.fr/mpeg/doc_end_user/documents/131_OnLine/wg11/m54519-v1-m54519.zip. m54519, Media Access Function.docx [Retrieved on Jun. 24, 2020] the whole document.
"Information Technology—Dynamic Adaptive Streaming Over HTTP (Dash)—Part 3: Implementation Guidelines", ISO, IEC JTC 1/SC 29/WG 11, ISO/IEC PDTR 23009-3:2015. IEC. 3. Rue de Varembe. PO Box 131. CH-1211 Geneva 20, Switzerland, Oct. 20, 2015 (Oct. 20, 2015), 62 Pages, XP082008847, [Retrieved on Oct. 20, 2015] Paragraph [5.2.5]—Paragraph [5.2.5 2].
International Search Report and Written Opinion—PCT/US2021/038390—ISA/EPO—dated Oct. 8, 2021.
Thomas E., (INU) et al., "[MPEG-I Architecture] On Multi-Access Edge Computing and CDN Delivery for MPEG-I Assets", 130. MPEG Meeting, Jun. 20, 2020-Apr. 24, 2020, Alpach, (Motion Picture Expert Group or ISO/IEC JTC1/SC29/WG11), No. m53535, Apr. 15, 2020 (Apr. 15, 2020), XP030287131, 8 Pages, Retrieved from the Internet: URL: http://phenix.int-evry.fr/mpeg/doc_end_user/documents/130_Alpbach/wg11/m53535-v1-m53535-OnMulti-accessEdgeComputingandCDNdeliveryforMPEG-Iassets.zip. m53535—On Multi-access Edge Computing and CON Delivery for MPEG-I Assets.docx.
"WD of Scene Description for MPEG Media", 130, MPEG Meeting, Apr. 20, 2020-Apr. 24, 2020, ISO/IEC JTC 1/SC 29/WG 11 N19070, Alpbach, (Motion Picture Expert Group or ISO/IEC JTC1/SC29/WG11), No. n19289, (Apr. 25, 2020 (Apr. 25, 2020), XP030285548, 14 Pages, Retrieved from the Internet: URL: http://phenix.int-evry.fr/mpeg/doc_end_user/documents/130_Alpbach/wg11/w19289.zip. SC29WG11 N19289.docx [Retrieved on Apr. 25, 2020] the whole document.

* cited by examiner

900

Obtain Media Information And Buffer Information For A Media Object Determined From A Scene Description For At Least One Media Scene, Wherein The Media Information Identifies An Expected Format For Storing The Media Object In One Or More Output Buffers Of A Media Pipeline, And Wherein The Buffer Information Includes One Or More Attributes Of The One Or More Output Buffers
902

Initialize The Media Pipeline For The Media Object Based On The Media Information And The Buffer Information
904

Obtain The Media Object In A Delivery Format; Generating One Or More Processed Media Objects At Least In Part By Processing The Obtained Media Object, Wherein Each Processed Media Object Of The One Or More Processed Media Objects Is Converted From The Delivery Format To The Expected Format For Storing Each Processed Media Object In An Output Buffer Of The One Or More Output Buffers
906

Output The One Or More Processed Media Objects To The One Or More Output Buffers Using The Initialized Media Pipeline
908

FIG. 9

MEDIA ACCESS FUNCTION FOR SCENE DESCRIPTIONS

CROSS-REFERENCE TO RELATED APPLICATIONS

This application claims the benefit of U.S. Provisional Application No. 63/043,491, filed Jun. 24, 2020, which is hereby incorporate by reference, in its entirety and for all purposes.

FIELD

This application is related to systems and methods for processing media. For example, aspects of this disclosure are directed to a media access function (MAF) for retrieving, processing, and delivering media objects.

BACKGROUND

Many devices and systems allow media data to be processed and output for consumption. The media data can include video data and/or audio data. For example, digital video data can include large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC). Video coding generally utilizes prediction methods (e.g., inter-prediction, intra-prediction, or the like) that take advantage of redundancy present in video images or sequences. An important goal of video coding techniques is to compress video data into a form that uses a lower bitrate, while avoiding or minimizing degradations to video quality.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported in a variety of ways, such as transmission over a computer network using network streaming.

BRIEF SUMMARY

In some examples, systems and techniques are described for decoupling fetching and rendering operations in performing media access and delivery. According to at least one illustrative example, a method of processing media content is provided. The method includes: obtaining media information and buffer information for a media object determined from a scene description for at least one media scene, wherein the media information identifies an expected format for storing the media object in one or more output buffers of a media pipeline, and wherein the buffer information includes one or more attributes of the one or more output buffers; initializing the media pipeline for the media object based on the media information and the buffer information; obtaining the media object in a delivery format; generating one or more processed media objects at least in part by processing the obtained media object, wherein each processed media object of the one or more processed media objects is converted from the delivery format to the expected format for storing each processed media object in an output buffer of the one or more output buffers; and outputting the one or more processed media objects to the one or more output buffers using the initialized media pipeline.

In another example, an apparatus for processing media content is provided that includes a memory and one or more processors (e.g., implemented in circuitry) coupled to the memory. The one or more processors are configured to and can: obtain media information and buffer information for a media object determined from a scene description for at least one media scene, wherein the media information identifies an expected format for storing the media object in one or more output buffers of a media pipeline, and wherein the buffer information includes one or more attributes of the one or more output buffers; initialize the media pipeline for the media object based on the media information and the buffer information; obtain the media object in a delivery format; generate one or more processed media objects at least in part by processing the obtained media object, wherein each processed media object of the one or more processed media objects is converted from the delivery format to the expected format for storing each processed media object in an output buffer of the one or more output buffers; and output the one or more processed media objects to the one or more output buffers using the initialized media pipeline.

In another example, a non-transitory computer-readable medium is provided that has stored thereon instructions that, when executed by one or more processors, cause the one or more processor to: obtain media information and buffer information for a media object determined from a scene description for at least one media scene, wherein the media information identifies an expected format for storing the media object in one or more output buffers of a media pipeline, and wherein the buffer information includes one or more attributes of the one or more output buffers; initialize the media pipeline for the media object based on the media information and the buffer information; obtain the media object in a delivery format; generate one or more processed media objects at least in part by processing the obtained media object, wherein each processed media object of the one or more processed media objects is converted from the delivery format to the expected format for storing each processed media object in an output buffer of the one or more output buffers; and output the one or more processed media objects to the one or more output buffers using the initialized media pipeline.

In another example, an apparatus is provided that includes: means for obtaining media information and buffer information for a media object determined from a scene description for at least one media scene, wherein the media information identifies an expected format for storing the media object in one or more output buffers of a media pipeline, and wherein the buffer information includes one or more attributes of the one or more output buffers; means for initializing the media pipeline for the media object based on the media information and the buffer information; means for obtaining the media object in a delivery format; means for generating one or more processed media objects at least in part by processing the obtained media object, wherein each processed media object of the one or more processed media objects is converted from the delivery format to the expected format for storing each processed media object in an output buffer of the one or more output buffers; and means for outputting the one or more processed media objects to the one or more output buffers using the initialized media pipeline.

In some aspects, the media information and the buffer information are provided as parameters of a Media Access Function (MAF) Application Programming Interface (API) call made for the media object of the scene description In some aspects, the media information includes one or more source locations for obtaining the media object.

In some aspects, the media information identifies one or more presentation parameters for playback of the media object from the one or more output buffers.

In some aspects, the media pipeline is initialized using one or more calls to the MAF API.

In some aspects, the method, apparatuses, and computer-readable medium described above further comprise controlling each output buffer of the one or more output buffers at least in part by passing the buffer information to a buffer Application Programming Interface (API) using the one or more calls to the buffer API.

In some aspects, initializing the media pipeline comprises allocating a new buffer in response to a determination that a buffer identifier does not belong to an existing buffer, the allocating being based on one or more buffer attributes associated with the buffer identifier.

In some aspects, the buffer information comprises a buffer list, each entry of the buffer list including a respective buffer identifier and being associated with the one or more buffer attributes.

In some aspects, the one or more output buffers include at least one circular buffer.

In some aspects, the scene description includes a Graphics Language Transmission Format (glTF) scene description.

In some aspects, the at least one media scene comprises one or more immersive media objects, the one or more immersive media objects including at least one of a three-dimensional (3D) mesh object, a 3D point cloud object, a virtual reality (VR) object, an augmented reality (AR) object, and a 6 Degrees-of-Freedom (DoF) object.

In some aspects, the media object is obtained in the delivery format from a source location selected from one or more source locations identified in the media information.

In some aspects, the one or more source locations are identified in the media information using at least one of a Universal Resource Locator (URL), a Uniform Resource Identifier (URI), and a local file path.

In some aspects, the one or more source locations identified in the media information comprise a default media source location and one or more alternative media source locations different from the default media source location.

In some aspects, the selected source location is determined based on one or more selection factors identified in the media information, the one or more selection factors comprising one or more of playback preferences, playback capabilities, and network characteristics.

In some aspects, the media object is obtained from a source location selected based on a view information determined from the one or more MAF API calls.

In some aspects, the view information determined from the one or more MAF API calls includes a position of the media object relative to a viewer position.

In some aspects, the method, apparatuses, and computer-readable medium described above further comprise: configuring the source location based on the view information; wherein the configuring comprises one or more of adjusting a level of detail of the obtained media object, adjusting a bitrate of the obtained media object, and adjusting a portion of the obtained media object that is visible.

In some aspects, an apparatus can be or can be part of a mobile device (e.g., a mobile telephone or so-called "smartphone," or other mobile device), a personal computer, a laptop computer, an extended reality (XR) device (e.g., a virtual reality (VR) device, an augmented reality (AR) device, or a mixed reality (MR) device), a smart wearable device, a server computer, a camera (e.g., a digital camera, an Internet Protocol (IP) camera, etc.), a multi-camera system, or other device. In some aspects, the apparatus includes a camera or multiple cameras for capturing one or more images. In some aspects, the apparatus includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 9 is a flow diagram illustrating an example of a process for using media pipelines and buffers to fetch media objects, in accordance with some examples;

DETAILED DESCRIPTION

Figure 1:
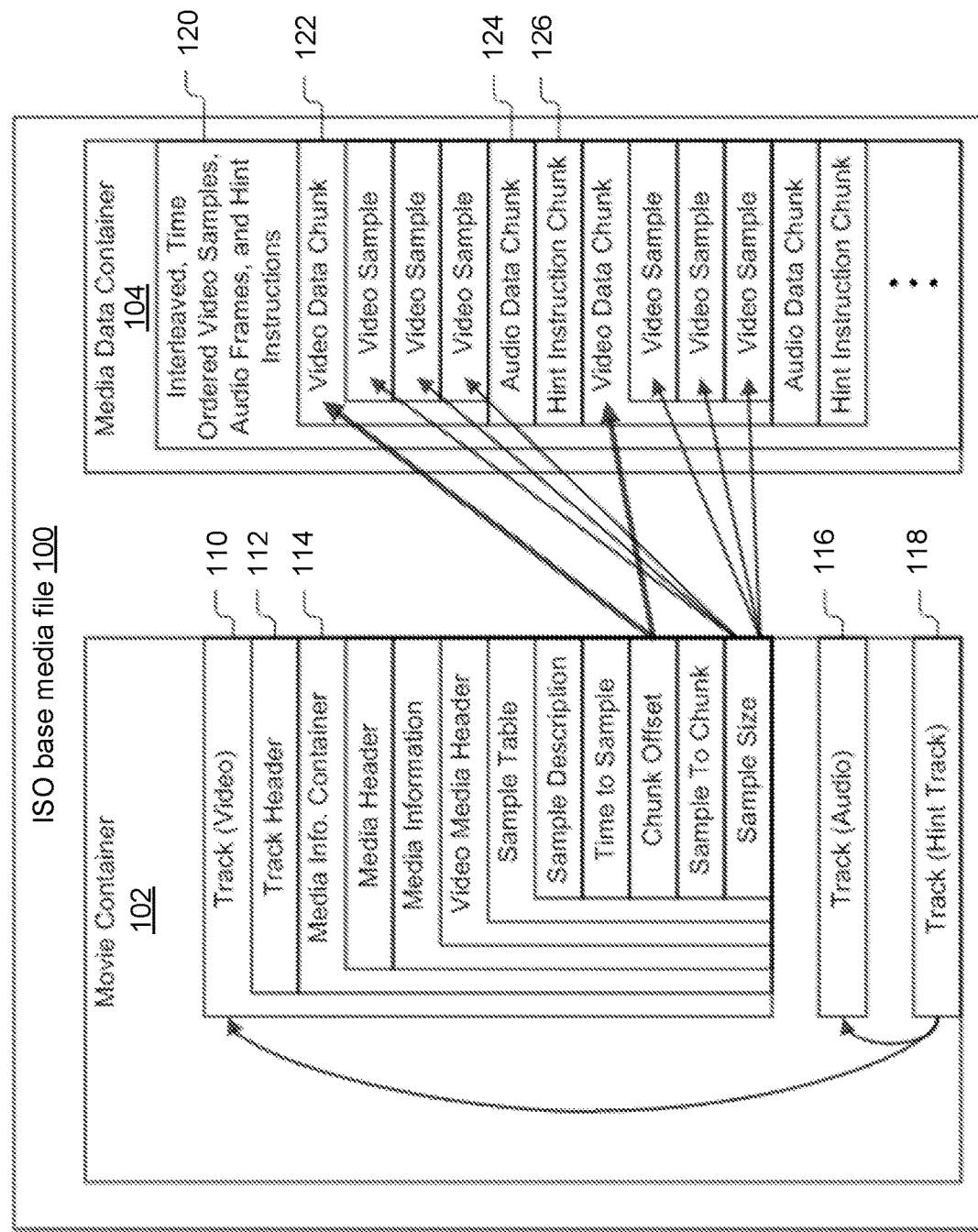
FIG. 1 is a diagram illustrating an example file structure following the ISO base media file format (ISOBMFF), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As systems for presenting audiovisual and/or multimedia content have grown in both popularity and sophistication, so too has the processing workload imposed in delivering such content in a seamless and enjoyable manner to end users experienced a commensurate increase. This increased processing workload can be attributable to the significantly expanded scale and scope of the types of multimedia content that are delivered for presentation to users. Examples of multimedia content include two-dimensional (2D) media content, three-dimensional (3D) media content (also referred to as immersive media content or 360-degree media), among others.

2D media content can include a handful of discrete media element types (e.g., video tracks, audio tracks, metadata or subtitle tracks, etc.). Immersive or 3D media content can include more complex information than 2D media content. For example, in addition to including one or more of the media element types noted above for 2D media content, immersive media content can include multiple additional media element types. For example, the additional media element types can be delivered to a presentation engine along with the 2D media element types noted above, often simultaneously. The additional media element types associated with immersive media content can include, but are not limited to, 2D textures, 3D meshes, 3D point clouds, depth maps, transparency/specular reflection data, occlusion data, and/or other element types. Moreover, some immersive media content can also be interactive, in which case further media element types may be needed, such as 3 Degrees-of-Freedom (3DoF) data for immersive scenes where users can change their direction of gaze (e.g., to look around a 3D virtual scene, such as in virtual reality environments), 6DoF data for immersive scenes where users can change both their direction of gaze and their location within the scene (e.g., to walk around a 3D virtual scene).

Accordingly, in comparison to 2D media content, immersive media content can involve a substantially greater computational workload, not only in terms of the final processing to render immersive media elements at the presentation engine, but also in terms of the backend retrieval, pre-processing, and delivery of the immersive media elements to the presentation engine prior to rendering of the media elements by the presentation engine. Additionally, a robust architecture for buffering or otherwise delivering requisite media elements to the presentation engine can be important in the context of presenting immersive media content, which, unlike traditional 2D media content, often does not follow a linear temporal scheme. For instance, an open-world 3D environment where the user is free to roam and explore presents content based on a calculated user position rather than a timestamp.

Although both 2D media content and immersive media content can be presented under the same general framework in which various media elements are retrieved and delivered to a presentation engine (e.g., under the Moving Picture Experts Group (MPEG) standard), additional considerations can be needed for the optimal delivery and presentation of immersive media elements in light of the factors discussed above. Further, as the complexity of immersive media content continues to rapidly advance, a scalable and efficient buffering solution becomes more desirable. Even further, immersive media is increasingly becoming widely adopted by institutions and consumers, in which case a lightweight yet robust buffering solution (capable of seamless operation on even low-end consumer-grade computational hardware) is desirable.

Systems, apparatuses, processes (also referred to as methods), and computer readable media (collectively referred to as "systems and techniques") are described herein that provide an improved media access architecture. The media access architecture can be used for delivering media content and media elements for presentation. The media content and media elements can include, but are not limited to, one or more of the media content types and/or media element types discussed above. The media access architecture can include a "Media Access Function" or "MAF", described in more detail below. As will also be described in greater detail below, the media access architecture provides a flexible solution for the retrieval, pre-processing, buffering, and delivery of various media types. Examples of the various media types include, but are not limited to, 2D media elements and the 3D/immersive media elements discussed above. As used herein, media elements can include video elements, audio elements, and/or other media elements.

For purposes of illustration and example, the presently disclosed media access architecture is described with respect to the Moving Picture Experts Group (MPEG) standard, although it is noted that this is not intended to be construed as limiting and the media access architecture can be used for various other types of non-MPEG media (e.g., VVC media, HEVC media, AVC media, Alliance for Open Media (AOMedia) Video 1 (AV1) media, among others) without departing from the scope of the present disclosure. The MPEG standard includes a proposed improvement to existing scene description formats in order to support immersive media, with a specific instantiation for glTF 2.0 ('Graphics Language Transmission Format'). The media access architecture described herein can provide specific extensions that address identified gaps within the existing MPEG and glTF 2.0-based framework(s), while also retaining compatibility and/or interoperability.

In some examples, the systems and techniques described herein provide for the improved delivery of media content and elements (immersive or otherwise) by decoupling the fetching of media from the rendering of media. A media access function (MAF) (e.g., of the media access architecture noted above, and as described herein) can be provided between various media sources that deliver media content to a player device or system and a presentation engine of the player device or system. The media access architecture (including the MAF) can be part of the player device or system, integrated as a hardware component, a logical component, or some combination of the two. A presentation engine can be used to process and render the content of a scene. This scene content can be delivered or otherwise made available to the presentation engine by the MAF. The MAF can perform media fetching and related tasks such as pre-processing, decoding, format conversion, etc., while the presentation engine can perform rendering functions, resulting in the decoupling of the rendering by the presentation engine from the fetching of the media content from the media sources by the MAF. In some examples of this decoupling dynamic, the MAF can asynchronously retrieve and prepare media content for rendering, on request by the presentation engine. At some later time, the presentation engine can then access the media content retrieved and prepared by the MAF and render the content of a scene.

In some cases, the MAF can be configured to deliver any given media element in a file format that is requested or expected by any given presentation engine, in which case the MAF is not restricted to any particular presentation engine(s). In some cases, the MAF is not restricted to any particular media sources. For instance, the MAF can access or retrieve media content from any media source that is addressable or reachable (e.g., locally or over a wired or wireless network) by the MAF. In some cases, the MAF is not restricted to any particular input file formats. For example, the MAF can process media content in any input file format for which the MAF can read or can retrieve an appropriate plugin for the input file format. In some examples, the MAF can be a plugin usable by one or more presentation engines, can be integrated with (e.g., integrated into the software of, etc.) one or more presentation engines, a combination of the two, and/or otherwise implemented.

In operation, the presentation engine can parse and process a scene description for given item of media content (referred to as a media content item). Based on parsing and processing the scene description, the presentation engine can determine information about the specific media elements that the presentation engine will render, e.g., each media content item is associated with a scene description, which specifies a plurality of media elements of that media content item. Based on the scene description (and any subsequent scene description updates), the presentation engine can communicate with the MAF so that the MAF can initiate the retrieval of any media elements (from one or more media sources) needed for the rendering by the presentation engine. Such communication from the presentation engine to the MAF can be performed using an Application Programming Interface (API) of the MAF, also referred to herein as a "MAF API". For instance, the presentation engine can make a call to the MAF API, which can cause the MAF to initiate the retrieval of one or more media elements from one or more media sources. In some examples, a MAF API call from the presentation engine to the MAF API can include parameters and other information specifying the manner in which the MAF will retrieve one or more particular media elements. In one illustrative example, a MAF API call can include: 1) a source location or identifier for a requested media element; 2) an indication of which parts of the media element are needed, and in what resolution/level of detail; 3) timing information for when the requested media element has to be made available; 4) output information including a requested format for the media element and details of how the media element will be passed to the presentation engine; any combination thereof; and/or any other suitable information.

In response to the MAF API call, the MAF can initialize, allocate, or initialize one or more media pipelines to perform media fetching and/or decoding tasks. For example, a media pipeline can be initialized or allocated to perform both media fetching tasks and decoding tasks, while in another example a media pipeline can be initialized or allocated such that it is dedicated to performing either media fetching tasks or decoding tasks. In some cases, a media pipeline can be initialized when the MAF (or presentation engine) determines that the media pipeline has not yet been created. If a media pipeline has already been created, in some examples the MAF can determine that the existing media pipeline needs to be reconfigured, e.g., according to one or more parameters specified in the MAF API call, in which case the MAF can allocate or re-allocate the existing media pipeline as needed.

Media and/or metadata are fetched and processed through the one or more media pipelines. For instance, a media pipeline can take as input one or more media elements or other tracks of a media content item (including metadata) and perform one or more processing, decoding, and/or encoding operations. The media pipelines can include decoding and encoding engines (e.g., a video decoding engine, an audio encoding engine, etc.), processing engines (e.g., to perform tasks that include, but are not limited to, streaming, demultiplexing, decoding, decryption, encoding, format conversion, etc.), and one or more buffers (e.g., circular buffers or other types of buffers). The one or more media pipelines can terminate into a final output buffer or a set of final output buffers. In some examples, the final output buffer(s) can be included in the media pipeline.

The final output buffers are used to exchange data with the presentation engine. For instance, the MAF can use the media pipeline to retrieve a requested media element from the source location identified in the API call. The MAF can decode the requested media element from its delivery format (e.g., the format in which the requested media element is provided to the MAF by the media source location) to a requested format identified in the API call (e.g., a format used by the presentation engine for rendering). The MAF can perform one or more pre-processing operations if needed. The MAP can then output the media to the final output buffer(s) in the requested format identified in the API call.

In some examples, buffer management (e.g., instantiating and allocating buffers) can be performed by the MAF, the presentation engine, or some combination thereof using a buffer API. In some cases, the MAF can have the primary responsibility for buffer management. Because each media pipeline can include one or more buffers, buffer instantiation can be performed simultaneously with and/or in conjunction with media pipeline instantiation. One or more buffers can also be initialized in an already existing media pipeline (e.g., a new buffer can be added to the existing media pipeline).

As mentioned previously, in some cases an existing media pipeline (which can contain one or more buffers) might need to be reconfigured or allocated based on parameters and/or media information contained in the MAF API call. Accordingly, the MAF can also utilize the buffer API to reconfigure, allocate, or reallocate existing buffers as well, e.g., such that the existing buffer is configured in light of any newly received MAF API calls. In one illustrative example, a media pipeline and/or buffer may already exist because a similar or same media element is currently being processed via a different API call or was recently processed in response to a prior API call. In another illustrative example, certain frequently used and/or complex media pipelines and/or buffers can be left active rather than being discarded or released after task completion (which can lead to efficiencies in time and/or compute resources.

Using the systems and techniques described herein, the MAF decouples the presentation engine from the increasingly complex tasks associated with media retrieval and processing, which can include connecting to multiple different source locations, handling delivery formats that are different from the presentation engine's expected format, performing hardware and/or other resource management and allocation, and performing decoding, encoding, and pre-processing tasks. Advantageously, the MAF API (and in some cases the buffer API) serve to abstract away the challenges and execution of such tasks, distilling the tasks into API calls that provide a consistent language for any given presentation engine to access disparate media elements and sources.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Different types of media formats can be used for encapsulating video, such as coded video. One example of a media format includes the ISO base media file format (ISOBMFF, specified in ISO/IEC 14496-12, which is hereby incorporated by reference in its entirety and for all purposes). There are also other media file formats derived from the ISOBMFF (ISO/IEC 14496-12), including MPEG-4 file format (ISO/IEC 14496-14), 3GPP file format (3GPP TS 26.244) and AVC file format (ISO/IEC 14496-15). For example, a video bitstream encoded as discussed above can be written or packed into one or more files using the ISOBMFF, a file format derived from the ISOBMFF, some other file format, and/or a combination of file formats including the ISOBMFF. The ISOBMFF file or files can be played back using a video player device, can be transmitted by an encoding device (or file generation device) and then displayed by a player device, can be stored, and/or can be used in any other suitable manner.

The ISOBMFF is used as the basis for many codec encapsulation formats (e.g., the AVC file format, among others), as well as for many multimedia container formats (e.g., the MPEG-4 file format, the 3GPP file format (3GP), the DVB file format, among others). Continuous media (e.g., audio and video), static media (e.g., images), as well as metadata can be stored in a file conforming to the ISOBMFF. Files structured according to the ISOBMFF may be used for many purposes, including local media file playback, progressive downloading of a remote file, segments for Dynamic Adaptive Streaming over HTTP (DASH), containers for content to be streamed and packetization instructions for the content, recording of received real-time media streams, among other suitable purposes. For example, although originally designed for storage, the ISOBMFF has proven to be very valuable for media streaming (e.g., for progressive download or DASH). For streaming purposes, movie fragments defined in ISOBMFF can be used.

The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism (e.g., DASH or other suitable streaming mechanism). A "presentation," as defined by the ISOBMFF specification, can include media files related to a sequence of pictures, often related by having been captured sequentially by a video capture device, or related for some other reason. In some examples, a presentation may also be referred to as a movie, a video presentation, or a rendering. In some examples, a presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. A box is the elementary syntax structure in the ISOBMFF, including a four-character coded box type, the byte count of the box, and the payload. Boxes can include a header that provides a size and a type for the box. The size describes the entire size of the box, including the header, fields, and all boxes contained within the box. Boxes with a type that is not recognized by a player device are typically ignored and skipped.

An ISOBMFF file can contain different kinds of boxes. For example, a Movie box ("moov") contains the metadata for the continuous media streams present in the file, with each media stream being represented in the file as a track. The metadata for a track is enclosed in a Track box ("trak"), while the media content of a track is either enclosed in a Media Data box ("mdat") or directly in a separate file. There can be different kinds of tracks. The ISOBMFF specifies, for example, the following types of tracks: a media track, which contains an elementary media stream; a hint track, which either includes media transmission instructions or represents a received packet stream; and a timed metadata track, which comprises time-synchronized metadata.

The media content for tracks include a sequence of samples, such as audio or video access units or frames, referred to as media samples. Such media samples are differentiated from an image sample described above, where an image sample is an individual color component of a pixel. As used herein, the term "media sample" refers to the media data (audio or video) associated with a single time (e.g., a single point in time, a time range, or other time). The metadata for each track includes a list of sample description entries, each providing the coding or encapsulation format used in the track and the initialization data needed for processing that format. Each sample is associated with one of the sample description entries of the track.

The ISOBMFF enables the use of sample-specific metadata using various mechanisms. Specific boxes within a Sample Table box ("stbl") have been standardized to respond to common needs. For example, a Sync Sample box ("stss") can be used to list the random access samples of the track. The sample grouping mechanism enables mapping of samples, according to a four-character grouping type, into groups of samples sharing the same property, specified as a sample group description entry in the file. Several grouping types have been specified in the ISOBMFF.

FIG. 1 is a diagram illustrating an example of a file 100 with a file structure following the ISO base media file format. The ISO base media file 100 can also be referred to as a media format file. A media presentation can be, but is not always, contained in one file, in which case the media presentation is self-contained in the file. The file 100 includes a movie container 102 (or "movie box"). The movie container 102 may contain the metadata of the media, which can include, for example, one or more video tracks and one or more audio tracks. For example, a video track 110 may contain information about various layers of a video, which may be stored in one or more media information containers 114. For instance, a media information container 114 may include a sample table, which provides information about the video samples for the video. In various implementations, the video data chunk 122 and the audio data chunk 124 are contained in the media data container 104. In some implementations, the video data chunk 122 and the audio data chunk 124 can be contained in one or more other files (other than file 100).

In various implementations, a presentation (e.g., a motion sequence) may be contained in several files. All timing and framing (e.g., position and size) information can be in the ISO base media file and the ancillary files may essentially use any format.

The ISO files have a logical structure, a time structure, and a physical structure. The different structures are not required to be coupled. The logical structure of the file is of a movie that in turn contains a set of time-parallel tracks (e.g., video track 110). The time structure of the file is that the tracks contain sequences of samples in time, and those sequences are mapped into the timeline of the overall movie by optional edit lists.

The physical structure of the file separates the data needed for logical, time, and structural de-composition, from the media data samples themselves. This structural information is concentrated in a movie box (e.g., movie container 102), possibly extended in time by movie fragment boxes. The movie box documents the logical and timing relationships of the samples, and also contains pointers to where the samples are located. Pointers may point into the same file or another file, which can be referenced by, for example, a Uniform Resource Locator (URL) or the like.

Each media stream is contained in a track specialized for that media type. For example, in the example illustrated in FIG. 1, the movie container 102 includes a video track 110 and an audio track 116. The movie container 102 may also include a hint track 118, which may include transmission instructions from the video track 110 and/or audio track 116, or may represent other information about other tracks in the movie container 102 or other movie container (not shown) of the file 100. Each track may be further parameterized by a sample entry. For example, in the illustrated example, the video track 110 includes a media information container 114, which includes a table of sample (referred to as a "sample table"). A sample entry contains the "name" of the exact media type (e.g., the type of the decoder needed to decode the stream) and any parameterization of that decoder needed. The name may take the form of a four-character code (e.g., moov, trak, or other suitable name code). There are defined sample entry formats for various media types. The sample entries may further include pointers to video data chunks (e.g., video data chunk 122) in a box 120 in the media data container 104. The box 120 includes interleaved, time ordered video samples (organized into video data chunks, such as video data chunk 122), audio frames (e.g., in audio data chunk 124), and hint instructions (e.g., in hint instruction chunk 126).

Support for metadata can take different forms. In one example, timed metadata may be stored in an appropriate track, and can be synchronized as desired with the media data described by the metadata. In a second example, there is general support for non-timed metadata attached to the movie or to an individual track. The structural support is general, and allows, as in the media data, the storage of metadata resources elsewhere in the file or in another file.

In some cases, one track in a video file can contain multiple layers. The video track may also include a track header (e.g., track header 112), which may contain some information about the contents of the video track (e.g., video track 110). For example, the track header may include a track content information (also referred to as 'tcon') box. The tcon box may list all of the layers and sub-layers in the video track. A video file may also include an operating point information box (also referred to as an 'oinf' box). The oinf box records information about operating points, such as the layers and sub-layers that constitute the operating point, dependencies (if any) between the operating points, the profile, level, and tier parameter of the operating point, and other such operating point relevant information. In some cases, an operating point can also be referred to as an operation point.

Figure 2:
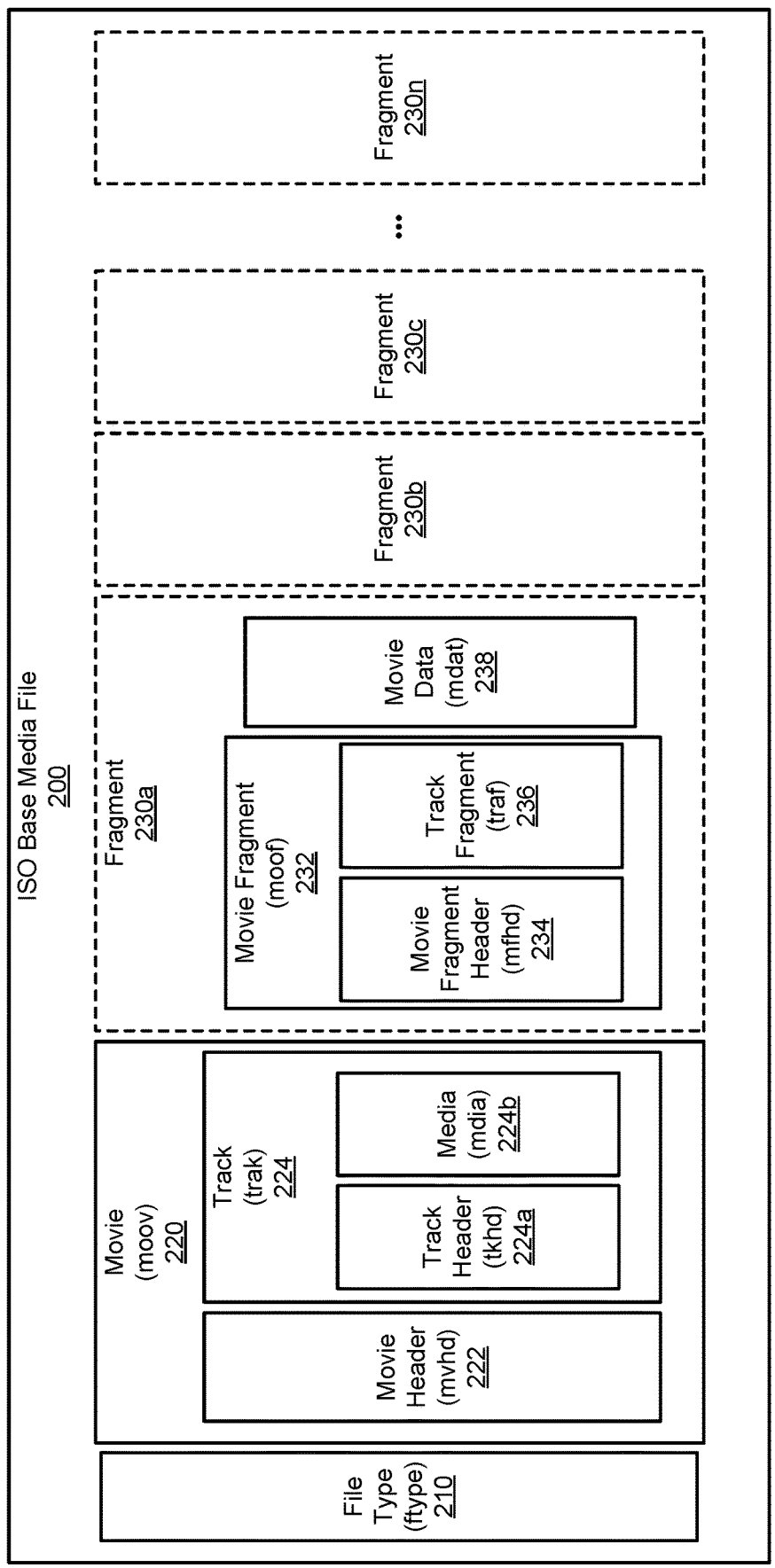
FIG. 2 is a diagram illustrating an example of an ISO base media file (formatted according to the ISOBMFF) that contains data and metadata for a video presentation, in accordance with some examples.

FIG. 2 is a diagram illustrating another example of an ISO base media file 200 formatted according to the ISOBMFF. The ISO base media file 200 can also be referred to as a media format file. The ISO base media file 200 contains data and metadata for a video presentation. At the top level of the file 200, there is included a file type box 210, a movie box 220, and one or more fragments 230a, 230b, 230c, through 230n. Other boxes that can be included at this level but that are not represented in this example include free space boxes, metadata boxes, and media data boxes, among others.

The file type box 210 is identified by the box type "ftyp." The file type box 210 is typically placed as early as possible in the ISO base media file 200. The file type box 210 identifies an ISOBMFF specification that is the most suitable for parsing the file. "Most" in this instance means that the ISO base media file 200 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 210 can also include a version number, which can be used to indicate a version of the ISOBMFF specification. The file type box 210 can also include a list of compatible brands, which includes a list of others brands with which the file is compatible. An ISO base media file can be compatible with more than one major brand.

When an ISO base media file includes a file type box (like the ISO base media file 200), there is only one file type box. In some cases, an ISO base media file may omit the file type box in order to be compatible with older player devices. When an ISO base media file does not include a file type box, a player device can assume a default major brand (e.g., mp41), a minor version (e.g., "0"), and a compatible brand (e.g., mp41, isom, iso2, avc1, or the like).

The ISO base media file 200 further includes a movie box 220, which contains the metadata for the presentation. The movie box 220 is identified by the box type "moov." ISO/IEC 14496-12 provides that a presentation, whether contained in one file or multiple files, can include only one movie box 220. Frequently, the movie box is near the beginning of an ISO base media file (e.g., as indicated by the placement of the movie box 220 in the ISO base media file 200). The movie box 220 includes a movie header box 222, and can include one or more track boxes 224 as well as other boxes.

The movie header box 222, identified by the box type "mvhd," can include information that is media-independent and relevant to the presentation as a whole. For example, the movie header box 222 can include information such as a creation time, a modification time, a timescale, and/or a duration for the presentation, among other things. The movie header box 222 can also include an identifier that identifies the next track in the presentation. For example, the identifier can point to the track box 224 contained by the movie box 220 in the illustrated example.

The track box 224, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the example shown in FIG. 2, the example track box 224 includes a track header box 224a and a media box 224b. A track box can include other boxes, such as a track reference box, a track group box, an edit box, a user data box, a meta box, among others.

The track header box 224a, identified by the box type "tkhd," can specify the characteristics of a track contained in the track box 224. For example, the track header box 224a can include a creation time, modification time, duration, track identifier, layer identifier, group identifier, volume, width, and/or height of the track, among other things. For a media track, the track header box 224a can further identify whether the track is enabled, whether the track should be played as part of the presentation, whether the track can be used to preview the presentation, among other uses of the track. Presentation of a track is generally assumed to be at the beginning of a presentation. The track box 224 can include an edit list box (not shown) that can include an explicit timeline map. The timeline map can specify, among other things, an offset time for the track, where the offset indicates a start time, after the beginning of the presentation, for the track.

In the illustrated example, the track box 224 also includes a media box 224b, identified by the box type "mdia." The media box 224b can contain the objects and information about the media data in the track. For example, the media box 224b can contain a handler reference box, which can identify the media type of the track and the process by which the media in the track is presented. As another example, the media box 224b can contain a media information box, which can specify the characteristics of the media in the track. The media information box can further include a table of samples, as described above with respect to FIG. 1, where each sample describes a chunk of media data (e.g., video or audio data) including, for example, the location of the data for the sample. The data for a sample is stored in a media data box, discussed further below. As with most other boxes, the media box 224b can also include a media header box.

As shown in FIG. 2, the example ISO base media file 200 also includes multiple fragments 230a, 230b, 230c, through 230n of the presentation. A fragment can also be referred to as a movie fragment. A fragment (e.g., which in some cases can include a Common Media Application Format (CMAF) chunk) can extend a presentation in time. In some examples, a fragment can provide information that may have been included in a movie box ("moov"). A movie fragment (or CMAF chunk) can include at least a movie fragment box (identified by the box type "moof"), followed by a Media Data box (identified by the box type "mdat"). For example, the fragment 230a can include the movie fragment (moof) box 232 and the media data (mdat) box 238, and can extend a presentation by including additional information that would otherwise be stored in the movie box 220. The fragments 230a, 230b, 230c, through 230n are not ISOBMFF boxes, but rather describe a movie fragment box and a media data box that is referenced by the movie fragment box (e.g., the movie fragment box 232 and media data box 238 are referenced by the movie fragment box 232). The movie fragment box 232 and media data box 238 are top-level boxes, but are grouped here to indicate the relationship between a movie fragment box 232 and a media data box 238. Using movie fragment boxes (e.g., movie fragment box 232), a presentation can be built incrementally.

In some examples, the movie fragment box 232 can include a movie fragment header box 234 and a track fragment box 236, as well as other boxes not illustrated here. The movie fragment header box 234, identified by the box type "mfhd," can include a sequence number. A player device can use the sequence number to verify that the fragment 230a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 232 can also include one or more track fragment boxes 236, identified by the box type "traf" A movie fragment box 232 can include a set of track fragments, zero or more per track. The track fragments can contain zero or more track runs, each of which describes a contiguous run of samples for a track. Track fragments can be used to add empty time to a track, in addition to adding samples to the track.

The media data box 238, identified by the box type "mdat," contains media data. In video tracks, the media data box 238 can contain video frames, access units, NAL units, or other form of video data. A media data box can alternatively or additionally include audio data. A presentation can include zero or more media data boxes, contained in one or more individual files. The media data is described by metadata. In the illustrated example, the media data in the media data box 238 can be described by metadata included in the track fragment box 236 of the movie fragment box 232. In other examples, the media data in a media data box can be described by metadata in the movie box 220. The metadata can refer to a particular media data by an absolute offset within the file 200, such that a media data header and/or free space within the media data box 238 can be skipped.

Other fragments 230b, 230c, through 230n in the ISO base media file 200 can contain boxes similar to those illustrated for the first fragment 230a, and/or can contain other boxes.

As noted above, the ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A segment can include a portion of an ISO base media file format file, including a movie box along with associated media data and other boxes if present. A segment can also include a portion of an ISO base media file format file, including one or more movie fragment boxes, along with associated media data and other boxes if present. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 23009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

Additionally, scene description data can be utilized to provide support for immersive media presentation and experiences, leveraging but not limited to MPEG media and media objects. In some examples, scene description data can be based on glTF 2.0 (or other standards and formats) and can provide a set of specific extensions to address identified gaps. glTF is a file format (e.g., for three-dimensional (3D) scenes) and can be modeled using the JavaScript Object Notation (JSON) standard. For instance, glTF is an application programming interface (API)-neutral runtime asset delivery format.

In some examples, a 3D scene can be described by scene description data. The scene description data can be used to process and render the 3D scene. Scene description data can similarly be used to describe (and subsequently process and render) immersive media scenes, presentations, and experiences. The scene description data can be included in a file, a document, in syntax, or otherwise included along with media data or as stand-alone information (without any media data). For example, a scene description document (or file) can include the scene description data. In some examples, scene description data (e.g., in a scene description document) can describe 3D, immersive, and/or other types of scenes with a hierarchical node structure (e.g., with scene description data containing a description of node hierarchy, materials, cameras, as well as description information for meshes, animations, and other constructs for processing and rendering media objects of the 3D scene).

The aforementioned node structure of scene description data can also be considered as a directed acyclic graph (e.g., a tree-structure) representing the geometry of a scene (e.g., 3D, immersive, or otherwise) using an object-based hierarchy. For example, leaf nodes of the directed acyclic graph can represent geometric primitives, such as polygons. Each node in the graph can hold pointers to its child nodes. The child nodes can include, but are not limited to, individual nodes, a group or groups of other nodes, a geometry element, a transformation matrix, etc. Spatial transformations can be attached to certain nodes of the graph (e.g., by attaching the transformation matrix corresponding to a desired spatial transformation). Using such a scene description data structure, scene description data can be used to provide both geometry information and spatial information for processing and rendering a 3D scene.

In some examples, scene description data provides a binary data representation of the directed acyclic graph structure described above (which is also referred to as a "scene graph"). Using the representation contained within scene description data, the scene graph logic can be utilized by a presentation engine that is responsible for rendering the 3D scene described by the scene description data. The presentation engine can reduce its processing complexity by traversing the scene graph during rendering. For example, culling operations can be performed where branches of the scene graph are dropped from processing, without having to be fully traversed, if it is determined that the parent node's space is not visible or relevant to the rendering of the current viewing frustum (e.g., the region of modeled space that is displayed).

glTF 2.0 scene descriptions provide compact and low-level representations of scene graphs and can simplify processing by offering a JSON representation of a flat hierarchy of a scene graph. The glTF 2.0 scene descriptions are designed to eliminate redundancy and provide efficient indexing of the different objects contained in a scene graph. Additionally, the scene descriptions can include information for accessing or retrieving various media objects, files, and other media for rendering a 3D scene.

Figure 3:
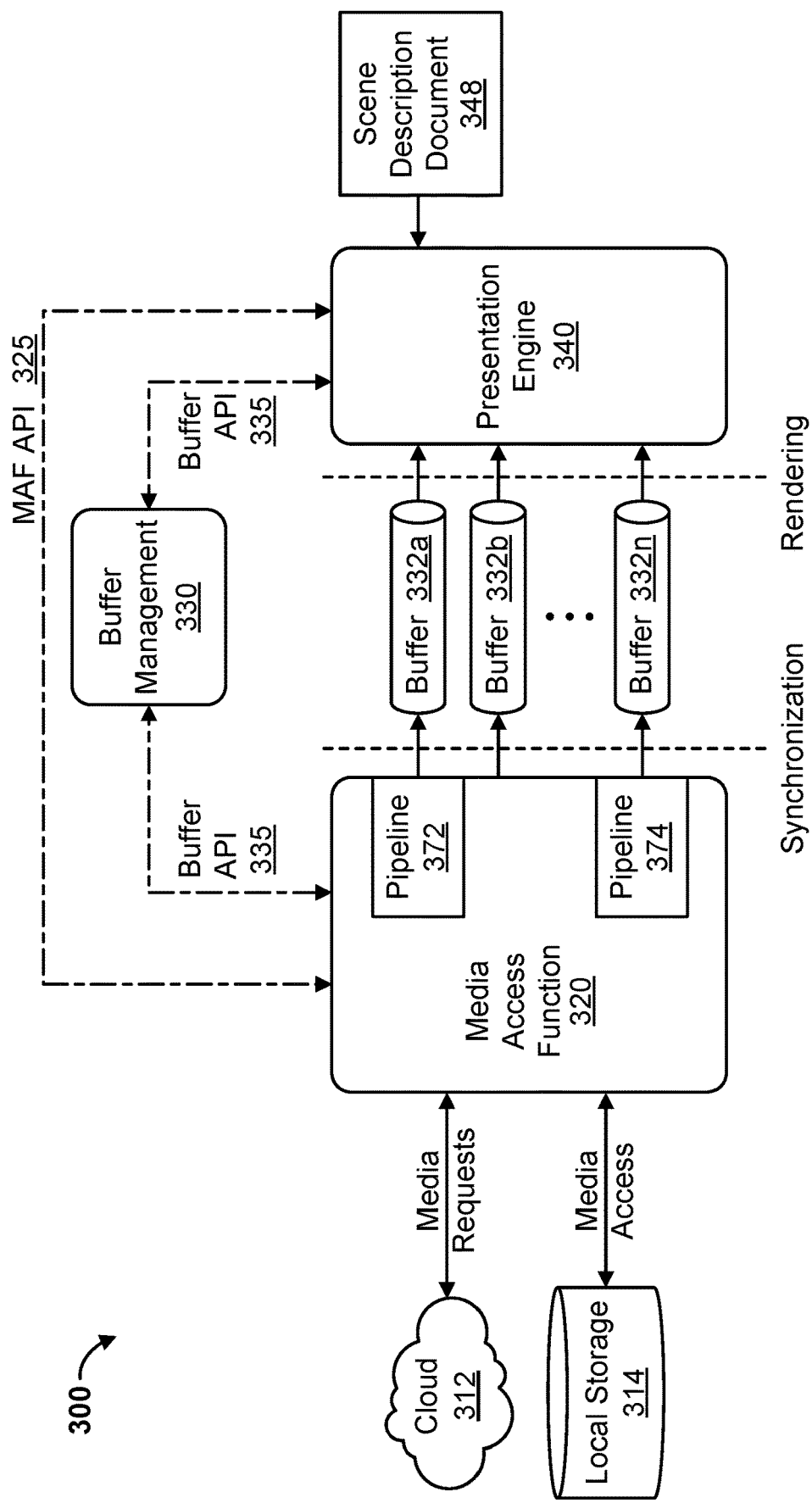
FIG. 3 is a diagram illustrating an example of a media system including a presentation engine and a Media Access Function (MAF), in accordance with some examples.

As noted above, systems and techniques are described herein that provide an improved media access architecture. FIG. 3 is a diagram illustrating an example of a media system 300. As shown, the media system 300 includes a presentation engine 340 and a media access function (MAF) 320. The presentation engine 340 processes and renders assets, which can include, for example, 3D scenes, immersive scenes, 2D scenes, and/or other types of scenes including media content. In some examples, the presentation engine 340 performs processing and rendering tasks for the presentation of a media scene that is described by a scene description document 348 that includes scene description data. The MAF 320 can retrieve and prepare media and/or media objects for rendering. For instance, the MAF 320 can receive one or more requests from the presentation engine 340 and can retrieve and prepare media and/or media objects for rendering in response to receiving the one or more requests. The media objects retrieved by MAF 320 may include the media objects that comprise the media scene described by the scene description document 348. As illustrated, the presentation engine 340 can interact and communicate with MAF 320 through a MAF Application Programming Interface (API) 325, which sits between the presentation engine 340 and MAF 320. The media system 300 also includes a buffer API 335, which provides the presentation engine 340 and MAF 320 with an interface to buffer management 330.

As will be described in greater depth below, the MAF API 325 and the buffer API 335 can be utilized to generate one or more media pipelines 372, 374 that decouple the rendering tasks of the presentation engine 340 from the media fetching tasks of the MAF 320. In an illustrative example, the presentation engine 340 parses the scene description document 348, identifies media information of media objects needed to render a particular media scene, and requests each of the media objects from the MAF 320 by passing the media information in one or more calls (e.g., one or more API calls) to the MAF API 325. The MAF 320 can then retrieve each media object from a source (e.g., network sources such as network source 312, local sources such as local source 314, and/or other sources) identified in the MAF API call. For instance, the MAF 320 can send one or more media requests to a network source, and the network source can reply to the one or more requests with one or more of the media objects. In another example, the MAF 320 can retrieve one or more of the media objects from the local source 314.

Once a media object or multiple media objects are received, the MAF 320 can use one or more media pipelines (e.g., media pipeline 372 and media pipeline 374) to process and perform format conversion for the one or more media objects, where appropriate. The media pipelines 372, 374 can be initialized, instantiated, or allocated by the MAF 320. For example, the MAF 320 can determine one or more parameters for the media pipelines 372, 374 based on the MAF API call and/or a call to buffer API 335. The media pipelines 372, 374 terminate into a plurality of buffers 332a, 332b, through 332n. The media pipelines 372, 374 deliver processed media objects into each of the buffers 332a, 332b, through 332n in an expected format requested by the presentation engine 340 in the MAF API call. The buffers 332a, 332b, through 332n can be any suitable type of buffer, such as circular buffers, static buffers, etc., or some combination of the above (e.g., the buffer 332a can be a different type of buffer from buffer 332b, or can be a same type of buffer).

In some examples, the exchange of data (e.g., media objects and/or metadata) between the MAF 320 and the presentation engine 340 does not occur directly. For instance, the exchange of data between the MAF 320 and the presentation engine 340 can instead be performed through the buffers 332a-n. Each buffer 332a-n can contain header information describing the content stored within each buffer 332a-n (e.g., the processed media object(s) it contains) and the timing associated with each buffer 332a-n. As illustrated in FIG. 3, functionality of buffer management 330 is exposed to the MAF 320 and the presentation engine 340 via the buffer API 335.

By utilizing the media pipelines 372, 374 and the buffers 332a-n, the media rendering tasks performed by the presentation engine 340 can be decoupled from the media fetching tasks performed by the MAF 320. Although media objects can be stored in a variety of different locations, file formats, containers, etc., the presentation engine 340 is able to abstract these complications into standardized MAF API calls and moreover, is able to consistently find the requested media objects stored in the buffers 332a-n in the requested format and at a requested time.

The scene description document 348 can include media information used to parametrize the aforementioned MAF API calls (e.g., made to the MAF API 325 by presentation engine 340). The scene description document 348 can also include buffer information used to parameterize buffer API calls (e.g., made to the buffer API 335, by either MAF 320, presentation engine 340, or both). In some examples, the buffer information is included in a MAF API call. For instance, based on a received MAF API call including buffer information, that MAF 320 can use the buffer information to make calls to the buffer API 335 itself.

In an illustrative example, the presentation engine 340 receives and parses the scene description document 348 (and any following scene description updates) and identifies external media or other media objects that need to be presented. For each media object, the presentation engine 340 can determine or generate media information based on information or data obtained from parsing the scene description document 348. The presentation engine 340 can include the media information in an API call to the MAF API 325 when the presentation engine 340 requests each media object. In some cases, the media information can include timing information to identify the presentation time for each media object. The presentation time can be the time at which the media object needs to be presented in the rendered scene or can be an earlier time at which the media object needs to be delivered into one or more of the buffers 332a-n (e.g., prior to being rendered).

In some examples, the media information obtained based on parsing the scene description document 348 can include one or more media source locations indicating where the MAF 320 can find a requested media object (e.g., the media source locations can be provided as a Uniform Resource Locator (URL), a Uniform Resource Identifier (URI), etc.). In some cases, the one or more media source locations can include a primary or default media source location. In some examples, the primary or default media source location can be provided along with one or more alternative media source locations, such that MAF 320 can fallback to an alternative media source location if the MAF fails to obtain the requested media object from either the primary media source location or a previously attempted alternative media source location. In some examples, the MAF 320 can perform a selection amongst the different media source locations. For instance, the MAF 320 can select one or more source locations from the different media source locations based on user preferences and/or network characteristics such as bandwidth, latency, etc., which indicate whether a particular media source location is the most preferable from among the different media source locations.

In some examples, the media information in the MAF API call can specify certain portions of a media object that are to be retrieved by the MAF 320 and/or can specify a level of detail in which the presentation engine 340 expects the media object to be delivered. In one illustrative example, a media object can be provided as a point cloud of a model representing a human figure. In such an example, the MAF API call can specify that only the portion of the point cloud corresponding to the face of the human figure is to be retrieved by MAF 320. In another illustrative example, a media object can include a high resolution texture, and the MAF API call can request a version of the texture with a resolution that is lower than the native, high resolution texture.

In some examples, the media information in the MAF API call can specify how the presentation engine 340 expects the MAF 320 to deliver a processed media object into one or more of the buffers 332a-n. For example, the media information can include a required or expected format for the processed media object, one or more buffer identifiers for delivery of the processed media object, an indication of one or more processing steps for MAF 320 to apply in order to generate the processed media object, etc. The format of a media object obtained from a media source location can differ from the expected format requested by the presentation engine 340. For example, the media source location can provide the media object as a compressed video stream in YUV420 and the presentation engine 340 can request the media object be provided in a buffer as interleaved RGBA color data. In some examples, the media source location can provide the media object as a compressed mesh stream with Draco and the presentation engine 340 can request the media object be provided in a vertex index list buffer, an XYZ position buffer (with X corresponding to a horizontal direction, Y corresponding to a vertical direction, and Z corresponding to a depth direction), and texture coordinate buffer. In some cases, the media source location can provide the media object as a compressed point cloud with MPEG V-PCC and the presentation engine 340 can request the media object be provided as an interleaved XYZRGBA buffer.

The presentation engine 340 can make individual calls to the MAF API 325 for each requested media object (and in some cases include the corresponding media and buffer information for that requested media object) and/or can make calls to the MAF API 325 that request multiple media objects at once. Based on the media information and any other parameters contained in the MAF API call, the MAF 320 can initialize one or more of the media fetching and decoding pipelines 372, 374 as necessary. In some examples, the MAF 320 can use the timing information provided by the presentation engine 340 in the MAF API call, such that the MAF 320 initializes or allocates the media pipeline(s) 372, 374 at an appropriate time (e.g., shortly before the media pipeline is needed).

Based on the MAF API call and the media information, the MAF 320 can ensure that each requested media object is made available at the appropriate time in the appropriate buffers 332a-n for access by the presentation engine 340. In some cases, prior to delivering the requested media objects, the MAF 320 can use the media information to decode, process, and/or reformat each media element to match the requested format of the presentation engine 340, as mentioned previously.

In some examples, the scene description document 348 contains all of the media information and buffer information that can be passed in calls to the MAF API 325 and the buffer API 335. In some cases, the presentation engine 340 can obtain or determine a portion of the media information from sources other than the scene description document 348, which may include lookup tables, internal or external databases, stored user preferences or settings, etc.

In some examples, the media and/or buffer information can be explicitly or directly represented in the scene description document 348 (e.g., as a stored value, variable, relationship, etc.). As mentioned previously, the presentation engine 340 can parse the scene description document 348 to obtain the media information and the buffer information. In some examples, the presentation engine 340 may parse the scene description document 348 and store the determined media and/or buffer information before later making API calls to the MAF API 325, the buffer API 335, or both. For example, the presentation engine 340 can parse the scene description document 348 initially upon receipt and can subsequently use the determined media and/or buffer information when needed in making an API call.

In some cases, the presentation engine 340 can perform an initial parsing of the scene description document 348 and can transmit multiple ones (e.g., all in some cases) of the MAF API and buffer API calls. In such cases, the media information and/or buffer information can include timing parameters specifying a time by which each media object must be provided in one of the buffers 332a-n, and the MAF 320 can use the timing parameters to perform its own scheduling process(es).

In some implementations, the presentation engine 340, the MAF 320, or both the presentation engine 340 and the MAF 320 can be included in a media playback device configured to present and/or display a media scene (e.g., integrated into a mobile device, a personal computer, a laptop computer, an extended reality (XR) device (e.g., a virtual reality (VR) device, an augmented reality (AR) device, or a mixed reality (MR) device), a set-top box, a television, gaming console, a smart wearable device, or other media playback device, etc.). In some cases, one or more of presentation engine 340 and MAF 320 can be provided remotely (e.g., over the Internet or a wired or wireless network). For example, the presentation engine 340 can be located locally in a media playback device and the MAF 320 can be located remotely. In such an example, the presentation engine 340 can transmit MAF API 325 calls over the Internet to the MAF 320, and the MAF 320 can deliver (e.g., stream) the requested media objects over the Internet to the presentation engine 340. Similarly, one or more of the buffers 322a-n can be located locally to the presentation engine 340 and/or the MAF 320 (e.g., in a media playback device) and/or remote from the presentation engine 340 and/or the MAF 320. Continuing in the context of the example above, a remote MAF could deliver processed media objects to a local buffer (e.g., in local storage or memory) associated with the presentation engine 340, and/or a remote MAF could deliver processed media objects to a remote buffer (e.g., in the cloud or on a networked server) which can subsequently deliver (e.g., stream) the processed media objects to the presentation engine 340.

The use of media pipelines 372, 374 can provide flexibility and interoperability to the selection and location of MAF 320 and presentation engine 340. For example, where previously the compatibility between different presentation engines and MAFs may have been limited by design constraints or choices (e.g., a presentation engine designed to accept media objects of certain file formats or in a particular configuration/arrangement of buffers; a MAF designed to output media objects in a different set of file formats or a different buffer configuration), the media pipelines described herein can be utilized to interconnect otherwise incompatible instances of the MAF 320 and the presentation engine 340. A more detailed discussion of media pipelines and their conversion of media objects from a delivery format provided by a media source to an expected format of the presentation engine is provided with respect to FIG. 5 and FIG. 6.

Returning to FIG. 3, it is noted that although two media pipelines 372, 374 are shown, in some cases a greater number of media pipelines can be provided or one media pipeline can be provided. For example, in some cases, one or more media pipelines can be initialized for each media object requested in a call by the presentation engine 340 to the MAF API 325. In such an example, there can be at least a 1:1 correspondence between the number of media objects requested by the presentation engine 340 and the number of media pipelines 372, 374 that are created to handle these requests. In some examples, the number of media pipelines can vary at any given moment, as in some examples inactive or idle media pipelines can be removed (e.g., to free up system resources). In some cases, the removal of inactive pipelines can be performed immediately after the media pipeline finishes outputting processed media objects into the buffers 332*a-n*, after a specified or pre-determined amount of time spent idle, and/or as needed based on a resource management policy. In some examples, the correspondence between the number of media pipelines and the number of media objects requested can be less than 1:1. For instance, rather than creating media pipelines to handle each individual request for a media object, media pipelines can be created to handle different request types. In one illustrative example, a given media pipeline can handle all media object requests that have the same delivery format, intermediate processing steps, and expected format in the output buffer. In some cases, initializing, allocating, or otherwise managing media pipelines can combine the two approaches outlined above. In one illustrative example, dedicated (or more permanent) media pipelines can be used to handle common or repeated media object requests and dynamically created (or more temporary) media pipelines can be used for the remainder of the media object requests.

Although FIG. 3 illustrates buffers 332*a-n*, in some cases a greater or lesser number of buffers can be utilized. For example, in a 1:1 correspondence, the number of buffers may be equal to the number of media pipelines, with each media pipeline being associated with a given output buffer. In some examples, a single media pipeline may output processed media elements into multiple different buffers and/or a single buffer may receive processed media elements from multiple different media pipelines, in which case there may not be a 1:1 correspondence. The relationship between a given pipeline and its associated output buffer(s) can be determined from the MAF API call. For example, the presentation engine can parse the scene description document 348 and can determine buffer information for each media object. In response to a MAF API call including some or all of this buffer information, MAF 320 can initialize and/or allocate the necessary buffers for each media object. For example, the MAF API call can indicate to MAF 320 the location, identity, and/or certain parameters of the buffer where the presentation engine 340 expects to find the processed media objects. With respect to the buffer information, it is noted that the buffer information can be determined simultaneously with the media information or separately from the media information.

Figure 4:
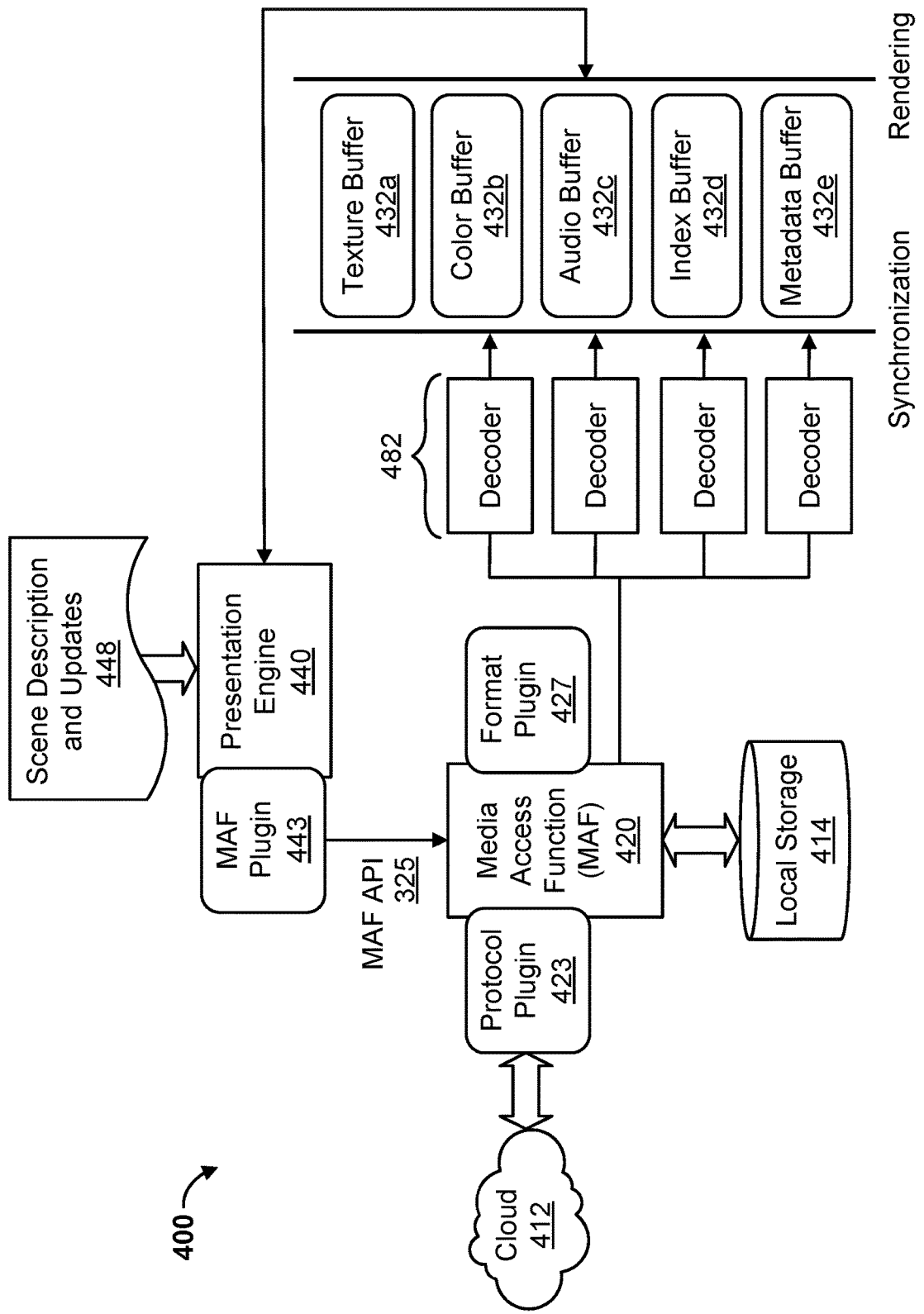
FIG. 4 is a diagram illustrating another example of a media system including a presentation engine and a MAF having plugins, in accordance with some examples.

FIG. 4 is a diagram depicting another example of a media system 400 including examples of different types of output buffers 432*a-e* that can be used for data exchange between a MAF 420 and a presentation engine 440. In some cases, the media system 400 illustrated in FIG. 4 can be the same as or similar to the media system 300 described above with respect to FIG. 3 and/or one or more constituent components of media system 400 can be the same as or similar to the corresponding one or more components of media system 300. As illustrated, the output buffers 432*a-e* can include, but are not limited to, a texture buffer 432*a*, a color buffer 432*b*, an audio buffer 432*c*, an index buffer 432*d*, and a metadata buffer 432*e*. One or more of the buffers 432*a-e* can be a circular buffer or a static buffer.

As illustrated, each one of the buffers 432*a-e* corresponds to a different type of media or media object that is requested or utilized by presentation engine 440 in rendering a media scene. Each buffer is also shown as receiving the output of a corresponding decoder 482. Although FIG. 4 does not depict media pipelines (such as the media pipeline 372 and the media pipeline 374 of FIG. 3), the decoders 482 can be included in or can be in communication with one or more media pipelines to process media objects received at the one or more media pipelines, as described above. In some examples, MAF 420 can analyze each MAF API request to determine a media type for each requested media object. Based on the determined media type, the MAF 420 can route each requested media object to the appropriate one(s) of the decoders 482 for processing the determined media type. Subsequently, each decoder to which one or more media objects were routed can output a processed media object into the appropriate one(s) of the buffers 432*a-e* for the determined media type. For example, texture media objects can be output to the texture buffer 432*a*, while color media objects can be output to the color buffer 432*b*. In some examples, the delivery of media objects into a type-specific output buffer 432*a-e* can be specified by the presentation engine 440 (e.g., by the presentation engine 440 constructing MAF API calls that specify the same output buffer for each requested media object of a given type, such as the audio buffer 432*c* for audio media objects).

In an illustrative example, after receiving a MAF API request from the presentation engine 440, the MAF 420 retrieves the media object(s) specified by the media information in the MAF API request. At least some of the requested media objects may be retrieved from local storage 414, with a specific path or location within the local storage 414 determined from the media information. At least some of the requested media objects may be retrieved from a remote source 412, shown in FIG. 4 as cloud storage. In some examples, when retrieving media object(s) from remote source 412, the MAF 420 can receive a URL and/or URI from the media information that indicates the source from which the media object(s) can be obtained.

In some examples, the MAF 420 can use one or more protocol plugins 423 in order to communicate with a remote source 412 that is identified in the media information from a MAF API request (e.g., using the protocol provided by protocol plugin 423). One or more protocol plugins can be integrated with the MAF 420, can be downloaded or obtained in response to a determination that the MAF 420 needs the protocol plugin 423 in order to reach a remote source and obtain a requested media object, or a combination of the two.

In some cases, the MAF 420 can use one or more format plugins 427 in order to convert between the different delivery formats initially provided by local storage 414, remote source 412, or other source and the different expected formats as requested by the presentation engine 440 (e.g., included in the media information of a MAF API call). Similar to the protocol plugin 423, one or more format plugins 427 can be integrated with the MAF 420, can be downloaded or obtained in response to a determination that the MAF 420 needs the format plugin 427 in order to process or convert the requested media object, or a combination of the two.

In some examples, the MAF 420 may itself be implemented with a plugin to the presentation engine 440 (e.g., as illustrated by MAF plugin 443). In some examples, the MAF 420 may be provided as a separate component of the media system 400 (in which case the MAF 420 is not implemented using a plugin). The MAF plugin 443 can provide the presentation engine 440 with the ability to utilize the MAF API 325 and request media objects from MAF 325. In some examples, the MAF plugin 443 can translate or convert media information (e.g., generated when the presentation engine 440 parses the scene description 448) into a properly formatted or constructed MAF API call. In some examples, the MAF plugin 443 can intercept media object requests that the presentation engine 440 generated with a first structure, and can convert (e.g., automatically convert) the requests from the first structure into the structure of a MAF API call (e.g., MAF plugin 443 could be used to convert existing requests into MAF API calls), providing compatibility with presentation engines that previously were not decoupled from media fetching.

Figure 5:
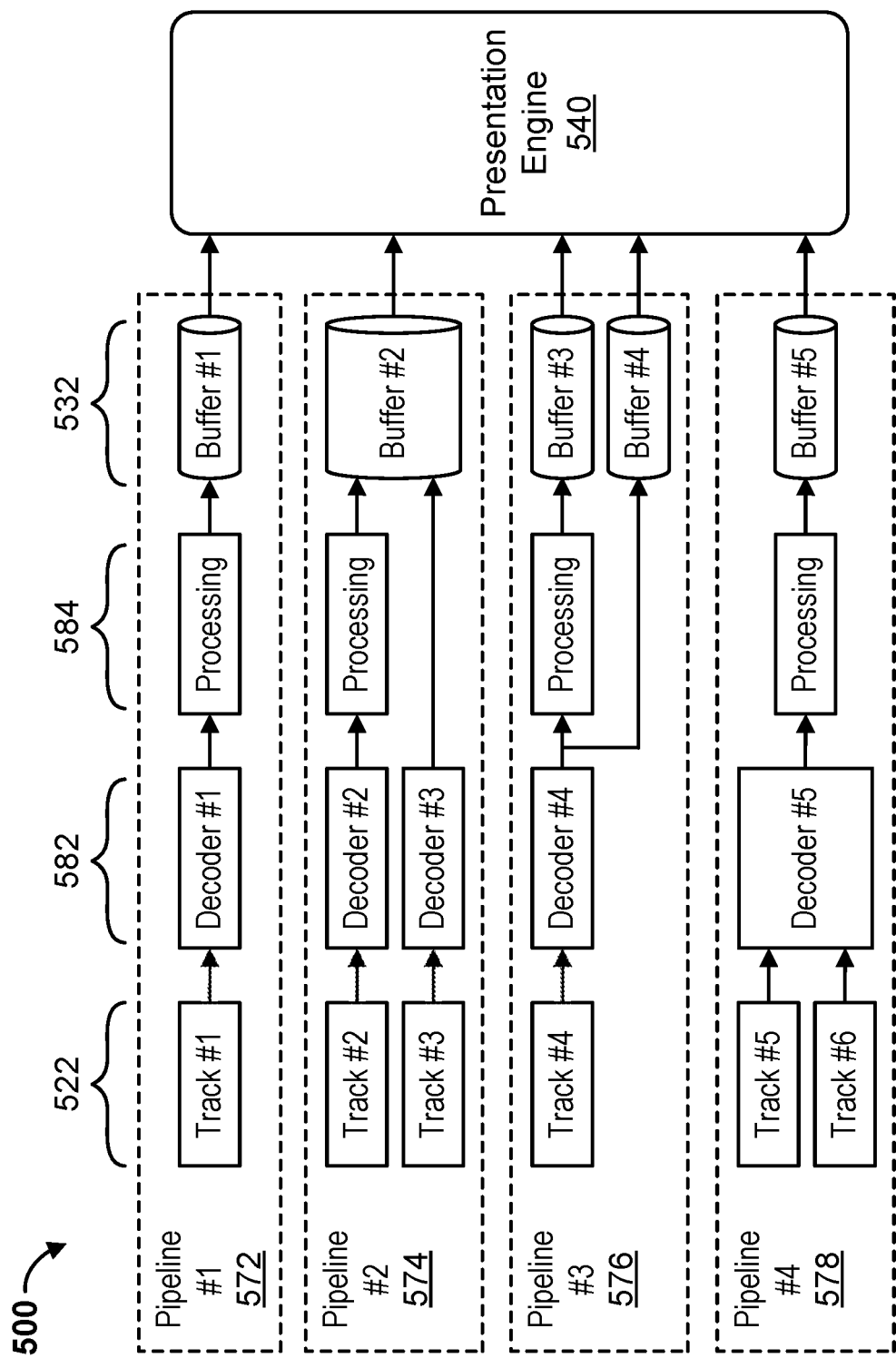
FIG. 5 is a diagram illustrating different examples of media pipelines, in accordance with some examples.

FIG. 5 is a block diagram of different examples and configurations of a set of media pipelines 572-578, which in some examples can be the same as or similar to one or more of the media pipelines discussed above and elsewhere. As shown, one or more media tracks 522 can include media data and in some cases other data (e.g., metadata, etc.). For example, a media track 522 can include a full media object (such as a 3D asset). In some cases, a media track 522 can include one or more components of a media object (e.g., media components such as a color component (red, green, blue, chroma, luma, etc.), depth, vertex positions, polygons, textures, etc.). The media data and/or other data is output to one or more decoders that can perform decoding operation(s) 582 to decode the media data and/or other data. The decoded data can be output for processing by the processing operation(s) 584. The processed data can then be output to one or multiple output buffers 532. In some examples, one output buffer (e.g., of the multiple output buffers 532) can receive processed data from multiple media pipelines. In some cases, an output buffer receives processed data from a media pipeline(s), but the output buffer is not included in the media pipeline(s). In some examples, a scene description obtained by a presentation engine 540 can describe attributes and/or parameters of all five of the media pipelines 572-578. Examples of decoding operation(s) 582 are described below with respect to FIG. 10 and FIG. 11. The processing operations 584 can convert formats and/or can create new static and/or dynamic buffers. For example, the processing operation(s) 584 can create index buffers based on metadata received from a media object (included in a media track 522) or a media track 522 itself.

In some cases, each media pipeline can perform one or more processing steps to an input media track 522. The processing operation(s) 584 can include, but are not limited to streaming, demultiplexing, decoding, decryption, format conversion, any combination thereof, and/or other processing functions. For example, format conversion can be performed to match the expected format for outputting processed media tracks to the buffers 532. The buffers 532 can be used to exchange data with the presentation engine 540, as previously described.

Although not shown, a Media Access Function (e.g., such as MAF 320) can perform setup and management (e.g., initialization) of the media pipelines 572-578. The media pipelines 572-578 can be constructed based on information determined from a scene description (e.g., the media information that the presentation engine 540 obtains by parsing a scene description and provides to the MAF via a MAF API call, as described previously). In some cases, the scene description can provide support for pipelines or media pipelines (e.g., the processing model of MPEG-I scene description can provide support for the concept of pipelines).

In one example, the pipeline 572 is illustrated as receiving as input a single track (track #1), applying a decoding operation and a processing operation, and then providing the presentation engine 540 with a processed media object in buffer #1. If the input track contains only media components (e.g., rather than a full media object), then in some cases the pipeline 572 can provide the presentation engine with processed media components in buffer #1. In some examples, pipelines can contain multiple instances of the elements and components that appear a single time in pipeline 572.

In another example, the pipeline 574 receives as input two tracks (track #2 and track #3) (which can each include one or multiple media objects and/or media components). In such an example, the two tracks are decoded separately (e.g., because they may each be obtained in a different format or encoding). A processing operation is applied to track #2 before it is output to buffer #2. Track #3 is also output to buffer #2, but without a processing operation applied. In some examples, a media pipeline can be configured to provide multiple tracks into the same output buffer because the requested media object is stored in multiple tracks. For example, a requested media object can be stored in multiple tracks when the requested media objects include multiple different media components. In some examples, the media pipeline can provide multiple tracks into the same output buffer based on a request from the presentation engine 540 (e.g., the presentation engine 540 expects the requested media object as multiple tracks, which the presentation engine 540 can then combine into the single, requested media object). As a particular example, the first track (e.g., track #2) can include color information and the second track (e.g., track #3) can include 3D position or depth information. Each different track type can be output to and processed by a separate decoder within the media pipeline. The media pipeline can then combine or mix the tracks into a single output buffer, as shown in the pipeline 574. In addition to separate decoding, each track can also undergo separate processing (or some tracks may not undergo any processing). For example, 3D position/depth information in a track (e.g., track #3) may undergo processing for conversion into an XYZ coordinate format (with X corresponding to a horizontal direction, Y corresponding to a vertical direction, and Z corresponding to a depth direction), while color information from a track (e.g., track #2) may be passed to a buffer without processing.

In the example of pipeline 576, a single input track is received (e.g., track #4) and, after decoding and processing are performed, is provided to two separate output buffers (e.g., buffers #3 and #4). In particular, the single input track is provided to one buffer in a decoded and processed form and provided to another buffer in a decoded, but un-processed form. A configuration such as pipeline 576 can be used in examples in which a single media track contains multiple (e.g., in this case, two) media components, such as one or more color components (e.g., red, green, blue, chroma, luma, etc.), depth information (e.g., for 3D scenes), vertex positions (e.g., for 3D scenes), polygons (e.g., for 3D scenes), textures, etc. For example, track #4 may comprise a single stream that stores both color information (as a first media component) and depth information (as a second media component). If the presentation engine 540 expects color information and depth information to be provided in separate output buffers, then media pipeline 576 can configure the decoder #4 to separate the two different media components after decoding, configure the processing element to process (as needed) only one of the media components (e.g., the color information or the depth information), and provide the media components to their own output buffers (e.g., to buffer #3 and buffer #4). The approach illustrated by pipeline 576 is in contrast with that of pipeline 574, the discussion of which contemplated the example of color information and depth information being obtained in two separate tracks and then being mixed by the pipeline into a single output buffer.

In the example of pipeline 578, two input tracks are received (track #5 and #6), subjected to the same decoding and processing operations, and provided to the same output buffer (buffer #5). In some examples, the two outputs (e.g., processed media objects and/or processed media components) can be stored separately in the output buffer. In some examples, the two outputs can be mixed and stored in the output buffer together (e.g., as described above with respect to pipeline 574; if the input tracks are both media components then the processed media components can be combined into a media object).

Figure 6:
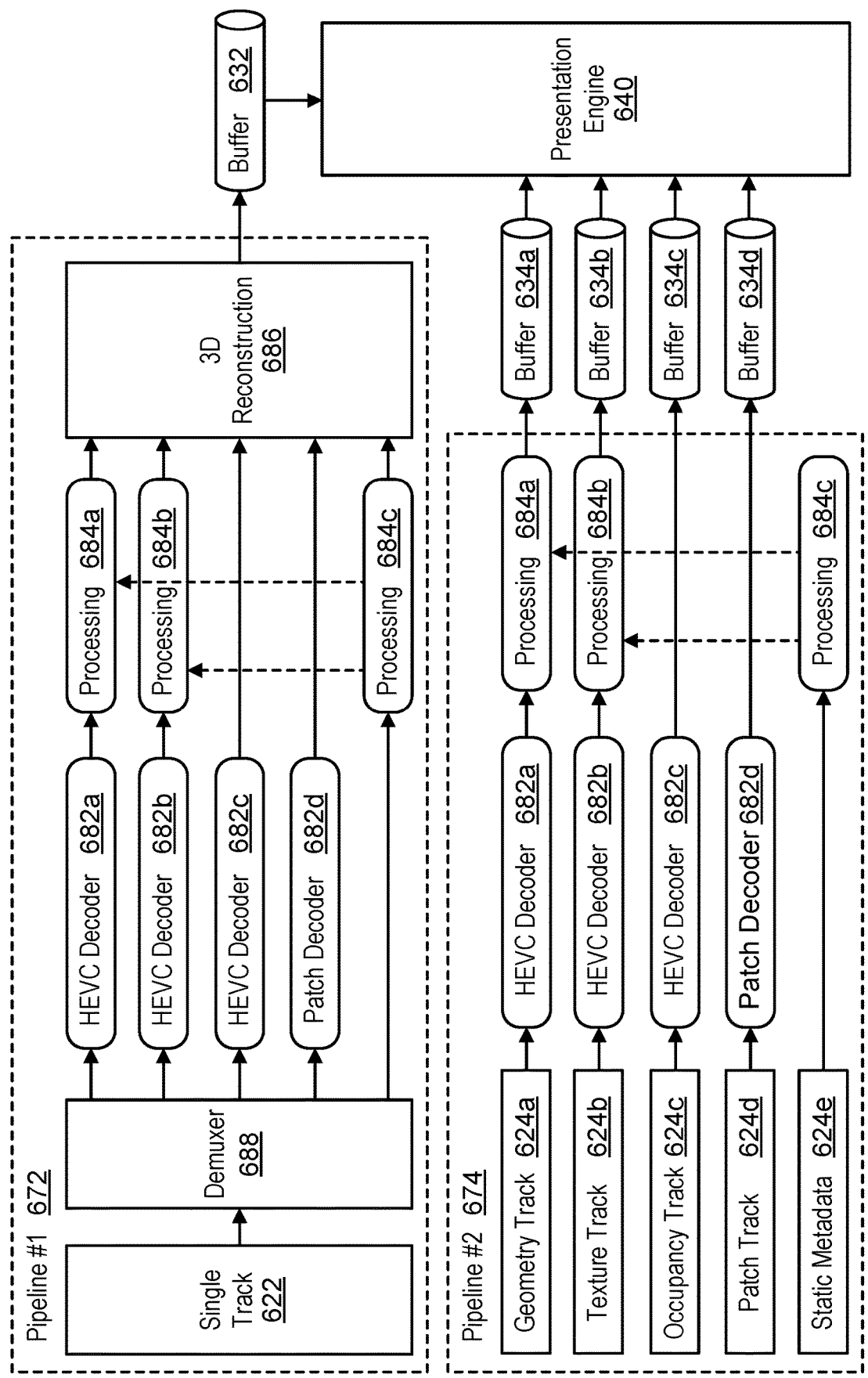
FIG. 6 is another diagram illustrating different examples of media pipelines, in accordance with some examples.

FIG. 6 is a block diagram of two example media pipelines 672 and 674, illustrating how internal processing functions and buffer outputs of different example pipeline configurations can be structured (e.g., initialized or otherwise configured by a MAF) based on the particular structure of the media objects or tracks received as input and/or based on information determined from a scene description (e.g., media information obtained by a presentation engine based on parsing a scene description and included to the MAF via a MAF API call, as previously described). For example, the input to the first media pipeline 672 is shown as a single track 622. In some examples, the track 622 can include the same multiple media objects that are each provided to the second media pipeline 674 in separate tracks 624a-e. For instance, the two media pipelines 672, 674 can receive, process, and output the same collection of media objects, but the manner in which the media objects are encapsulated is different.

Because the second media pipeline 674 receives the collection of media objects in discrete tracks 624a-e, each one of the discrete tracks can be provided directly to a corresponding decoder (e.g., the HEVC decoders 682a-c and the patch decoder 682d) and processing operations 684a, 684b, and 684c. The first media pipeline 672, however, receives the collection of media objects packaged or containerized as a single track 622. The first media pipeline 672 is therefore illustrated as initially passing the single track 622 to a demultiplexer 688 (illustrated as demuxer 688). The demuxer 688 can separate the single track 622 into its constituent individual media objects. Although not shown directly, the output of demuxer 688 can comprise the same five media objects provided to the second media pipeline 672 in the form of individual tracks 624a-e. The first media pipeline 672 can then decode and/or process the individual media objects in the same manner as the second media pipeline 674.

The second media pipeline 674 is shown as outputting the media objects contained in the individual tracks 624a-d into corresponding, individual output buffers 634a-d. In this example, the second media pipeline 674 outputs media objects in a structure that mirrors the initial delivery structure in which the media objects were provided. For instance, as shown in FIG. 6, at least four media objects are received in tracks 624a-d, and each of four output buffers 634a-d receive a particular processed media object. In one example, the buffer 634a receives a geometry media object from the geometry track 624a, the buffer 634b receives a texture media object from the texture track 624b, the buffer 634c receives an occupancy media object from the occupancy track 624c, and the buffer 634d receives a patch media object from the patch track 624d. It is noted that metadata from the static metadata track 624e is used by the processing steps 684a and 684b, and is therefore not output to a buffer.

Although the first media pipeline 672 uses demuxer 688 to generate individual representations of the media objects for purposes of internal pipeline processing operations, the first media pipeline 672 ultimately uses a 3D reconstruction operation 686 to consolidate the individual media object representations into a single output to the buffer 632. The output structure of the first media pipeline 672 mirrors the initial delivery structure in which the media objects were initially provided. For example, a single track 622 is provided and a single output buffer 632 receives a processed media object.

In some examples, the initial delivery structure of media objects (or tracks including one or more media objects) received at a media pipeline can be different from the output structure of the media pipeline. For example, a media pipeline can receive multiple inputs of media objects and output a single processed media object to a buffer. In some cases, a media pipeline can receive multiple inputs of media objects and output a number of processed media objects that is more than one but less than the number of input media objects. In the context of FIG. 6, in some examples the second media pipeline 674 can receive the multiple tracks 624a-e as input and provide output to the single output buffer 632 (e.g., by utilizing the 3D reconstruction operation 686 prior to the pipeline output stage).

In some examples, a media pipeline can receive a single input with multiple media objects included within the single input. From this single input, the media pipeline can then output multiple processed media objects to multiple output buffers. In the context of FIG. 6, in some cases the first media pipeline 672 can receive the single track 622 and provide the four output buffers 634a-d shown for second media pipeline 674. In some cases, a media pipeline can provide one output track to an output buffer. In some cases, a media pipeline can provide multiple output tracks to an output buffer.

For example, FIG. 6 depicts processed media objects (e.g., generated from the geometry track 624a and texture track 624b received as input at the second media pipeline 674) being provided to separate output buffers 634a, b. However, in one illustrative example, the processed media objects can both be provided to the same output buffer (e.g., one of the two output buffers 634a, b). In another illustrative example, the 3D reconstruction operation 686 of the first media pipeline 674 can output multiple processed media objects to the output buffer 632. The multiple processed media objects can be obtained prior to the 3D reconstruction operation 686 (e.g., the output(s) of the processing operations 684a-c can be provided to the output buffer 632 rather than to the 3D reconstruction operation 686. In some cases, the multiple processed media can be provided to the single output buffer 632 or can be provided to the multiple output buffers, in a 1:1 correspondence or some other correspondence ratio.

As was illustrated in the examples of FIGS. 5 and 6, the media pipelines can be configured with different designs, architectures, input/output structures, etc. In some cases, the media pipeline configuration and setup can be provided by a MAF API, such as the MAF API 325 described previously with respect to FIGS. 3 and 4. For example, one or more media pipeline setup or configuration parameters can be specified in MAF API calls that are generated by the presentation engine. In some cases, one or more media pipeline setup or configuration parameters can be determined from the media information (and/or buffer information) obtained from the presentation engine parsing a scene description or scene graph, as described previously.

In some examples, a MAF API (e.g., MAF API 325) can offer or provide one or more of the methods listed in Table 1, below:

TABLE 1

| Method | State after Success | Brief Description |
| --- | --- | --- |
| initialize( ) | READY | The Presentation Engine can initialize a new media pipeline and provides information related to the requested media object(s) and/or metadata. The MAF can setup the media pipeline and allocate the buffer(s), if they have not been allocated by the Presentation Engine. |
| startFetching( ) | ACTIVE | When a media pipeline is initialized and in a READY state, the Presentation Engine can request the media pipeline to start fetching the requested data. |
| updateView( ) | ACTIVE | Update the current view information. This function can be called by the Presentation Engine to update the current view information, e.g., if the pose or object position have changed significantly enough to impact media access. |
| stopFetching( ) | READY | The Presentation Engine may request to stop data fetching through this media pipeline. If subsequently, startFetching is called again, the stream fetching will resume from the current point, unless a start time is provided. |
| destroy( ) | IDLE | The Presentation Engine may request to destroy this media pipeline and free any associated resources. |

In some examples, the presentation engine can provide media information as a parameter to the initialize( ) function. The media information can contain information relating to the retrieval of requested media objects, the decoding of requested media objects, one or more processing operations to be applied to a requested media object, an expected delivery format for a processed media object, an expected or identified output buffer to receive a processed media object output by a media pipeline, etc.

In some cases, the presentation engine can use the initialize( ) function to initialize a media pipeline. In some examples, the presentation engine can use the initialize( ) function to trigger the creation and/or initialization of a media pipeline, where the presentation engine does not itself perform the media pipeline creation or initialization. In some cases, when the presentation engine does not create or initialize a media pipeline, the media pipeline can be created or initialized by the MAF (e.g., based on or in response to the initialize( ) function used by the presentation engine). For example, as was previously described, the presentation engine can use the MAF API and the MAF API functions to interface with the MAF and send commands and/or requests to the MAF.

An example interface definition language (IDL) description of a media pipeline interface is provided in Table 2 below (example data type definitions are provided in Table 3):

TABLE 2

```
interface Pipeline {
    readonly attribute Buffer buffers[ ];
    readonly attribute PipelineState state;
    attribute EventHandler onstatechange;
    void    initialize(MediaInfo mediaInfo, BufferInfo bufferInfo[ ]);
    void    startFetching(TimeInfo timeInfo, ViewInfo viewInfo);
    void    stopFetching( );
```

TABLE 2-continued

```
    void    updateView(ViewInfo viewInfo);
    void    destroy( );
};
```

Example IDL data type definitions are provided in Table 3 below:

TABLE 3

```
interface MediaInfo {
    attribute String name;
    attribute AlternativeLocation alternatives;
};
interface AlternativeLocation {
    attribute String mimeType;
    attribute TrackList tracks;
        attribute uri;
};
interface Track {
    attribute String track;
    attribute integer id;
    attribute integer bufferId;
};
interface TimeInfo {
    attribute double startTime;
    attribute double timeOffset;
    attribute boolean autoplay;
    attribute boolean loop;
};
interface BufferInfo {
    attribute integer bufferId;
    attribute BufferHandler handler;
    attribute ComponentType componentType;
    attribute SampleType sampleType;
    attribute integer offset;
    attribute integer stride;
    attribute AttributeType attributeType
};
interface ViewInfo {
    attribute Pose pose;
    attribute Transform objectPosition;
};
```

In some examples, the "Pipeline" parameter (e.g., of Table 2) can be used to provide a representation of a media pipeline. The "Pipeline" parameter can store a current pipeline state "PipelineState" of a media pipeline and can keep track of the output buffers of the media pipeline. In some cases, the PipelineState can be IDLE, READY, ACTIVE, or ERROR. The IDLE state can indicate that a media pipeline has not been initialized yet. The READY state can indicate that a media pipeline has been initialized and is ready to start fetching media. The ACTIVE state can indicate that a media pipeline is actively fetching media. The ERROR state can indicate that a media pipeline has encountered an error that stopped the media access.

In some examples, the "MediaInfo" parameter (e.g., of Table 2 and Table 3) can include location information corresponding to media objects that will be provided to a media pipeline. In some cases, the MediaInfo can include information provided by a scene description. In some examples, the MediaInfo can include information provided by a presentation engine (e.g., the information obtained from the presentation engine parsing a scene description document). In some examples, the MediaInfo can include information provided by the MPEG media extension. A MediaInfo can be assigned a name. In some cases, the MediaInfo can provide one or more alternative locations for the MAF or media pipeline to access a media object (e.g., the one or more alternative locations can be provided in an alternatives array). An alternative location can contain one or more of a MIME type, a set of tracks, and a URI that can be used to access requested media objects from the alternative location. The set of tracks can include an indication of the tracks that are to be accessed from the alternative location. In some examples, if the MediaInfo does not include an indication of the tracks to access, then all tracks or components of the alternative location can be accessed by the media pipeline.

In some examples, the "TimeInfo" parameter (e.g., of Table 2 and Table 3) can indicate a time point at which media and/or media objects are to be accessed. The TimeInfo can further indicate when to start the media access. In some examples, the semantics of one or more TimeInfo fields can be the field(s) provided in the MPEG media extension.

In some examples, the "BufferInfo" parameter can provide information about an expected format of an output buffer of the media pipeline (e.g., a requested format or expected format of the presentation engine making API calls to the MAF API). In some cases, the BufferInfo can include information about one or more buffers and can describe the format of the samples and frames that are stored in a given buffer. One or more tracks from the MediaInfo can feed into the same buffer. When multiple MediaInfo tracks are provided into the same buffer, the link between the track that provides the media object to the buffer and the buffer that will store the processed media object (e.g., output from the media pipeline o the buffer) can be indicated through the bufferId attribute. Buffers can be allocated by the MAF and/or by the presentation engine. A buffer handler can be used to read or pass a reference to an allocated buffer. If a buffer is allocated by the MAF, then in some examples read-only access can be permitted. In some cases, if a media pipeline is initialized without a valid buffer handler, then the MAF can allocate the buffer. In some examples, buffer format information can include componentType, sampleType, offset, and/or stride information. In some cases, the buffer format information can correspond to the componentType, type, offset, and stride information in a corresponding accessor and bufferView. An attributeType can correspond to a primitive attribute.

In some examples, the "ViewInfo" parameter can represent the current position(s) of an object that is rendered by the presentation engine using the media object. In some cases, the "ViewInfo" parameter can represent the current position(s) of a viewer's pose. The ViewInfo can be used to adjust the media access to the visibility of the object. For example, a distant object can be accessed at a lower Level of Detail (LoD). In some examples, the ViewInfo can contain pose information of the viewer (e.g., pose information including a position and an orientation of the viewer). The ViewInfo can also contain a position and an orientation of the object as a transform (e.g., a 4×4 matrix as defined by glTF 2.0). In some cases, the ViewInfo and associated information can use the same coordinate system as the scene.

The MAF can use the ViewInfo to optimize streaming of the requested media and/or media objects. For example, the MAF can use the ViewInfo to adjust a level of detail rendered by the presentation engine, based on the distance to and orientation of a viewer. In some cases, the distance to and orientation of the viewer can be calculated with respect to a device used by the user. In some examples, level of detail adjustments can be made to one or more polygons, one or more points, one or more texture resolution(s), and/or one or more other characteristics. The device used by the viewer can include, but is not limited to, a mobile device, a head-mounted display or other device for viewing virtual reality (VR), augmented reality (AR), and/or mixed reality (MR) content, and/or other devices.

A buffer API (such as the previously described buffer API 335) can be used by the MAF (such as the previously described MAF 320) and/or the presentation engine. For example, the buffer API can be used to allocate and control one or more buffers for the exchange of data (e.g., via media pipelines) between the presentation engine and the MAF. In some examples, the buffer API (e.g., buffer API 335) can offer or provide one or more of the following methods:

TABLE 4

| Method | Brief Description |
| --- | --- |
| allocate( ) | Allocates a buffer for data exchange between the MAF and the Presentation Engine. |
| writeFrame( ) | Writes a frame to the buffer. The write pointer moves to the next frame. |
| readFrame( ) | Reads a frame from the buffer. If no timestamp is provided, the buffer pointer moves to the next frame. Otherwise, the read pointer remains unchanged. |
| free( ) | Destroys the buffer(s) and frees any associated resources. |

When allocating a buffer, a buffer information can be provided (e.g., specifying a desired buffer configuration). In some examples, the buffer information can include a maximum size of the buffer, static information in a buffer header, a number of frames in the buffer (e.g., for circular buffers), an update rate of the buffer, any combination thereof, and/or other information.

An example interface definition language (IDL) description of a buffer API (e.g., such as buffer API 335) is provided below, in Table 5:

TABLE 5

```
interface CircularBuffer {
    readonly attribute Frame frames[ ];
    readonly attribute count;
    readonly attribute integer read_ptr;
    readonly attribute integer write_ptr;
    attribute integer headerLength;
    attribute EventHandler onframewrite;
    attribute EventHandler onframeread;
    void allocate(int count);
    void writeFrame(Frame frame);
    Frame readFrame( );
    void free( );
};
interface Frame {
    attribute integer index;
    attribute double timestamp;
    attribute integer length;
    attribute octet[length] data;
};
```

In some examples, the "count" parameter can indicate the number of frames contained in the given buffer. In some cases, the buffers can be circular buffers and the "count" parameter can include a number of frames contained in a given circular buffer. A frame of a buffer can hold data for a particular time instance and can, for example, be identified by an index in the range of [0, count−1]. One or more of the index, timestamp and length of the frame can be included in frame metadata.

In some examples, the "read_ptr" parameter can include an index of the frame that can be currently read from the buffer. In some cases, if the read_ptr is equal to the write_ptr, then there is currently no frame available to be read. In some examples, the "write_ptr" parameter can include an index of the frame of a buffer at which a write operation can be performed by the MAF or a media pipeline (e.g., using the MAF API).

In some examples, the "headerLength" parameter can provide a length of the header that is included at the start of a buffer frame. A headerLength of 0 can indicate that there is no buffer header.

In some examples, the "Frame" parameter can include information about a frame in the buffer. The buffer Frame can include one or more attributes or fields of a buffer (e.g., depicted in Table 5 as including an index attribute, a timestamp attribute, and a length attribute). The index attribute can indicate a position of a frame in the buffer. The timestamp attribute can correspond to a frame's presentation timestamp. The length attribute can correspond to a length of the buffer. In some examples, the timestamp format can be inherited from an accessed media or media object (e.g., the timestamp format can be an NTP timestamp, a 0-offset timestamp, or another format).

A more detailed example of buffer Frame attributes/fields is provided in Table 6, below:

TABLE 6

| Syntax | Length (bits) | Type | Semantics |
|---|---|---|---|
| index | 8 | int(8) | The index of the current buffer frame. The index can be a value between 0 and count −1. |
| timestamp | 64 | int(64) | Provides the timestamp of the data that is contained in this buffer. The format of this field can be in NTP Timestamp Format with 32 MSB for seconds and 32 LSB for fraction of seconds. Note that this timestamp field is not necessarily a wallclock time and in some cases the interpretation of this field is left to the rendering engine. |
| length | 32 | int(32) | The length of the data of this buffer frame, including accessor information header fields. |

As discussed previously, the MediaInfo can provide and/or contain a description of information needed to create or initialize one or more media pipelines. In one illustrative example, the MediaInfo provided for an HTML-5 media object (e.g., a video element) can be given as:

```
<video width="320" height="240" controls>
    <source src="movie.mp4" type="video/mp4">
    <source src="movie.ogg" type="video/ogg">
    Your browser does not support the video tag.
</video>
```

In the example above, the <video> tag can contain one or more <source> tags for a corresponding one or more video sources. Src can specify a URL of the video file (e.g., an mp4 video file, an ogg video file, etc.) Although not depicted in the example above, additional attributes can include, but are not limited to: Autoplay (e.g., specifying that a video will start playing as soon as it is ready); Height/Width (e.g., setting a height and/or width of a video); Loop (e.g., specifying that a video will repeat from its beginning, every time it is finished); and/or Preload (e.g., specifying if and how a video should be loaded upon an initial page load).

In some cases, media source extension (MSE) can be used to attach a SourceBuffer to a media element track. For example, provided below is an example sequence of steps that can be performed to attach a SourceBuffer to a media element track using MSE. The steps can be performed in the order provided below or in another order:

1. Define media codec details
   var mimeCodec='video/mp4; codecs="avc1.4D401F"'
2. Setup Media Source:
   var mediaSource=new MediaSource( )
3. Attach MediaSource to Media Element:
   video. src=URL.createObjectURL(mediaSource)
4. Add SourceBuffer to MediaSource:
   var sourceBuffer=mediaSource.addSourceBuffer (mimeCodec)
5. Define a Fetch and Append function
   function fetchSegmentAndAppend(segmentUrl, sourceBuffer)
6. Fetch and append Init Segment:
   fetchSegmentAndAppend("https://example.com/init.mp4", sourceBuffer)
7. Fetch and append first Media Segment:
   fetchSegmentAndAppend("https://example.com/media1.mp4", sourceBuffer)
8. Start playback:
   Video.play( );
9. Fetch and append next Media Segments:
   fetchSegmentAndAppend("https://example.com/media2.mp4", sourceBuffer)

In some cases, the information presented in the steps above can be summarized in a Media Presentation Description (MPD), for example following the description in the DASH profile for CMAF Media. In some cases, multiple source buffers can be provided for a single media source, (e.g., to provide time alignment). In some examples, a Session Description Protocol (SDP) can be generated for WebRTC (Web Real-Time Communication), to provide for real-time communication without plugins. In some cases, the SDP can also be generated to support peer-to-peer data sharing, and other media access, retrieval and/or delivery tasks of the MAF (and any associated buffers and/or media pipelines). For example, one or more portions of the media information and buffer information previously described above can be exchanged as part of an SDP Offer/Answer process.

Figure 7:
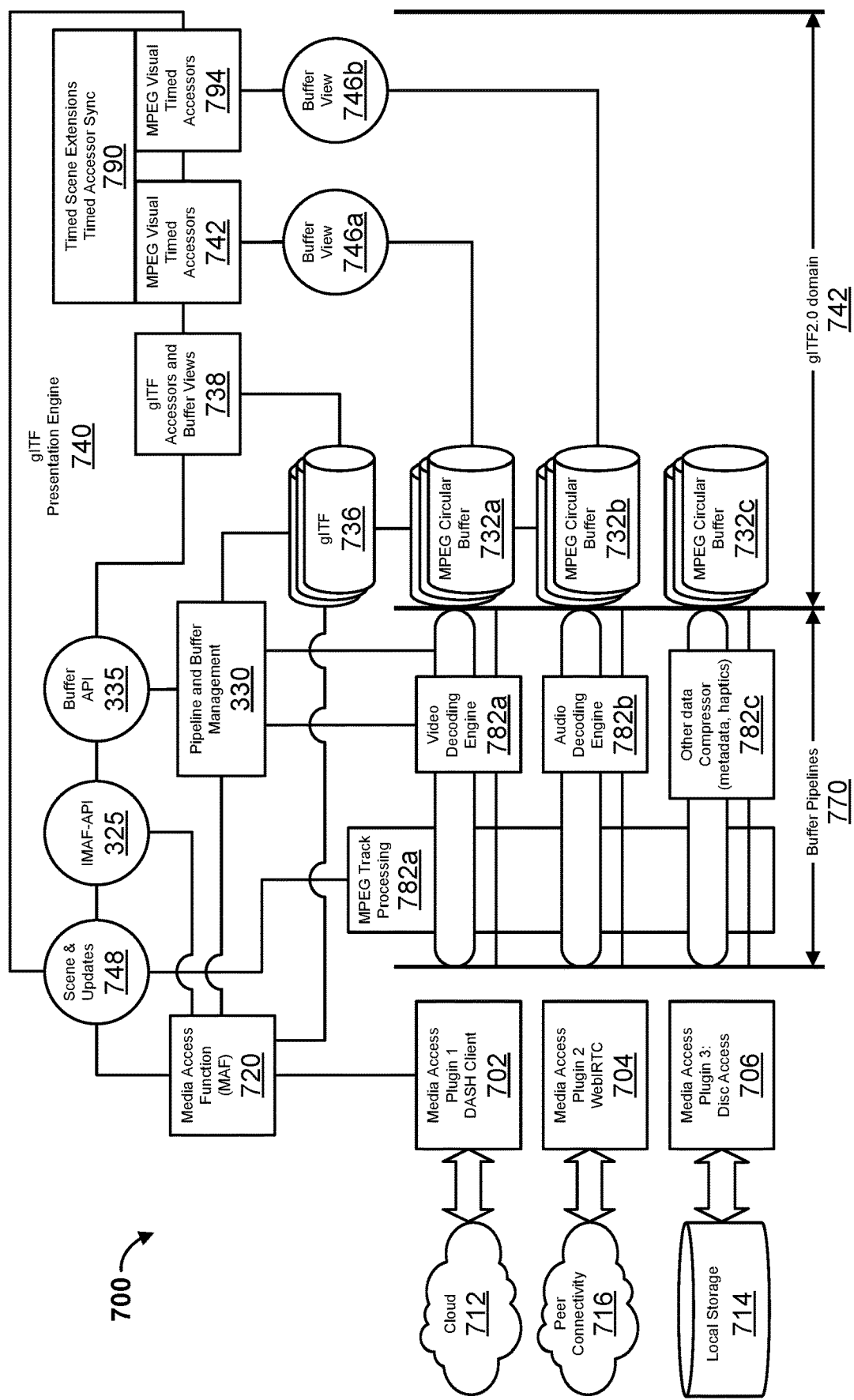
FIG. 7 is a diagram illustrating another an example of a system including a presentation engine and a MAF, in accordance with some examples.

FIG. 7 is a diagram illustrating an example of a media system 700 including a presentation engine 740 and a MAF 720 in the context of a glTF 2.0 presentation engine 740 requesting MPEG media. In some cases, the presentation engine 740, the MAF 720, or both the presentation engine 740 and the MAF 720 can be the same as or similar to the presentation engines and MAFs described previously (e.g., which include but are not limited to presentation engine 340 and MAF 320 of FIG. 3).

As described previously with respect to the media information examples discussed above, it can be seen that the media pipelines (also referred to as buffer pipelines, shown in FIG. 7 as buffer pipelines 770) can be provided with different media access technologies. For example, for each of the MPEG circular buffers 732a, 732b, and 732c that are to be filled, the Media Access Function (MAF) 720 can have sufficient information to select an appropriate source for a requested media object. In some examples, when multiple sources are specified (e.g., a primary source and one or more alternative sources), the MAF 720 can select between the multiple sources. For example, MAF 720 can select an appropriate source from the multiple sources made available to it based on factors such as user and/or system preferences, capabilities of the presentation engine 740, capabilities of the MAF 720, current or projected network conditions and capabilities, etc.

For a selected media source, the MAF 720 can have sufficient information to access the requested media/media objects. For example, MAF 720 can access the requested media objects by using a media access protocol corresponding to or otherwise appropriate for a file format, container, or type of a given media object. An example of the use of different media access protocols is illustrated in FIG. 7, which shows a first media access plugin 702 (e.g., for a DASH client), a second media access plugin 704 (e.g., for WebRTC), and a third media access plugin 706 (e.g., for disk access). As seen in FIG. 7, the media access protocols 702-706 can be used to access media and media objects stored in a certain location type. The DASH plugin 702 is shown as being used to provide MAF 720 with access to remote storage 712; the second media access plugin 704 (e.g., for WebRTC) is shown as being used to provide MAF 720 with access to peer connectivity 716; and the third media access plugin 706 (e.g., a disk access plugin) is shown as being used to provide MAF 720 with access to local storage 714. In some examples, different plugins can be used to access the media source locations 712-716. In some examples, MAF 720 can access the media source locations without the use of a plugin. In some examples, multiple plugins can be used to provide MAF 720 with access to a given media source location or a type of media source location.

For a selected media source, the MAF 720 also has sufficient information to setup one or more media pipelines to provide requested media objects to the presentation engine 740 (e.g., in the correct buffer format that is requested by presentation engine 740 in its calls to MAF API 325 and/or buffer API 335). Note that in the media system 700 of FIG. 7, individual media pipelines (e.g., such as those that have been discussed previously) are shown as the buffer pipelines 770. In some examples, one or more media pipeline processing steps and/or portions of media pipeline functionality can be provided as separate instances for each media pipeline. In some cases, one or more media pipeline processing steps and/or portions of media pipeline functionality can be shared or accessed as a common instance for multiple different media pipelines, or some combination of the two. In other words, video decoding engine 782a, audio decoding engine 782b, and the data compressors 782c can be provided as separate instances for each one of the buffer pipelines 770 as needed, and/or can be provided as shared instances (or single instances, as illustrated) that are accessed by the various different buffer pipelines 770 as needed.

In some examples, the MAF 720 can query or obtain additional information from the presentation engine 740 in order to optimize the delivery of one or more requested media objects. For example, MAF 720 can obtain additional information regarding a required quality for one or more of the output buffers (e.g., MPEG circular buffers 732a-c). The MAF 720 can also obtain timing information used by the presentation engine 740 for one or more of the requested media objects initially identified in the media information/call to MAF API 325, among other factors. The MAF 720 can also obtain GL Transmission Format (glTF) information, such as glTF accessors and buffer views 738 (e.g., identified by the bufferView variable noted herein). glTF is a standard file format for three-dimensional scenes and models. The glTF information can be stored in glTF buffer 736. Other information that can be used by the presentation engine 740 and/or the MAF 720 include MPEG visual timed accessors 742 and MPEG visual timed accessors 794 (which can be in communication with timed scene extensions and timed accessor sync 790, which can synchronize scene updates). In one example, an accessor in glTF 2.0 defines the types and layout of the data as stored in a buffer that is viewed through a bufferView. For instance, when timed data is read from a buffer, the data in the buffer could change dynamically with time. The buffer element can be extended to add support for a circular buffer that is used with timed data. Examples of buffer views that can be used by the system 700 include buffer view 746a and buffer view 746b. Scene update information 748 can also be used by the MAF 720 and/or the presentation engine 740 to update the scene. For example, when a media sample becomes active, the media player can load the sample data into the presentation engine 740, which can trigger a scene update performed by the presentation engine 740. If the scene update contains an addition of new information (e.g., glTF nodes and/or potential modifications of existing glTF nodes, such as one or more components), the presentation engine 740 can interacts with the MAF 720 to fetch any new content associated with the scene update and can present the new content accordingly.

Figure 8:
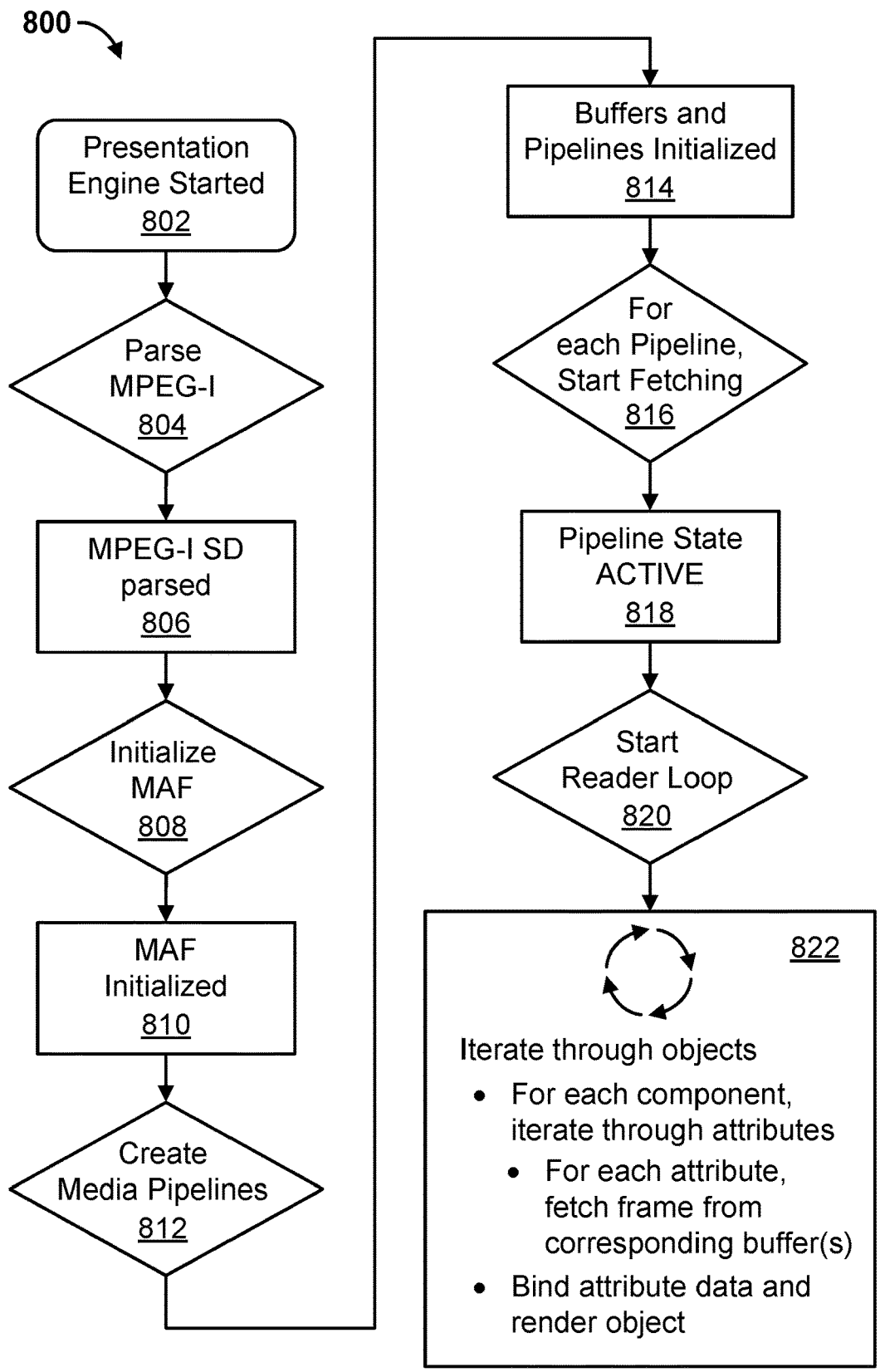
FIG. 8 is a flow diagram illustrating an example of a process for using media pipelines and buffers to fetch Moving Picture Experts Group (MPEG) media objects, in accordance with some examples.

FIG. 8 is a flow diagram illustrating an example of a process 800 for using one or more media pipelines and buffers to fetch MPEG media objects. At block 802, the process includes starting a presentation engine. In one illustrative example, the presentation engine includes the presentation engine 340 (shown in FIG. 3), the presentation engine 440 (shown in FIG. 4), the presentation engine 540 (shown in FIG. 5), the presentation engine 640 (shown in FIG. 6), and/or the presentation engine 740 (shown in FIG. 7). In some examples, the presentation engine can be used to render, present, or otherwise display a 3D media scene or an immersive media scene.

At block 804, the process 800 includes parsing an MPEG-I scene description file or document. In one illustrative example, the scene description file can be based on the glTF 2.0 format and includes the scene description document 348 shown in FIG. 3 and/or the scene description and scene update documents shown in FIG. 4. In some examples, parsing the scene description file can be performed by the presentation engine upon initial receipt or retrieval of the scene description file. In some cases, the scene description file can be parsed in an ongoing fashion (e.g., in which the presentation engine parses the scene description document to obtain media information and/or buffer information as needed to generate one or more calls to a MAF API and/or a buffer API). In one illustrative example, the MAF API includes the MAF API 325 shown in FIGS. 3, 4, and 7; and the buffer API includes the buffer API 335 shown in FIGS. 3, 4, and 7.

At block 806, the process 800 includes completing the parsing of the MPEG-I scene description. In one illustrative example, the MPEG-I scene description contains information corresponding to one or more different media objects that are used by the presentation engine to render an MPEG media scene. In some examples, the parsing of the MPEG-I scene description can be performed by the presentation engine to generate media information (e.g., MediaInfo as described with respect to Tables 2 and 3) and/or to generate buffer information (e.g., BufferInfo as described with respect to Tables 2, 3, 5, and 6). The output from parsing the MPEG-I scene description can be stored locally at the presentation engine, for example for later use in populating or otherwise generating one or more MAF API or buffer API calls. In some examples, the output from parsing the MPEG-I scene description can be stored remote from the presentation engine. In some examples, the output from parsing the MPEG-I scene description can be stored remote from the presentation engine, such that the presentation engine obtains or receives the output from parsing the MPEG-I scene description rather than performing the parsing itself.

At block 808, the process 800 includes initializing a Media Access Function (MAF). In one illustrative example, the MAF includes the MAF 320 (shown in FIG. 3), the MAF 420 (shown in FIG. 4), and/or the MAF 720 (shown in FIG. 7). In some cases, the MAF and the presentation engine can be provided at a same local media playback system or device. In some cases, the MAF and the presentation engine can be provided separately. In some examples, initializing the MAF includes initializing one or more plugins for the MAF and/or obtaining and configuring one or more plugins for the MAF. The plugins can include protocol plugins (such as protocol plugin 423 shown in FIG. 4), format plugins (such as format plugin 427 shown in FIG. 4), and/or MAF plugins to a presentation engine (such as MAF plugin 443 shown in FIG. 4). In some examples, the plugins initialized at or for the MAF can include one or more of the media access plugins 702-706 shown in FIG. 7.

At block 810, the process 800 includes completing the initialization of the MAF. In one illustrative example, completing the initialization of the MAF includes establishing (and/or confirming the ability to establish) a communication session between the MAF and the presentation engine. The communication session between the MAF and the presentation engine permits the transmission and exchange of requested media objects and their corresponding media information and/or buffer information, for example via one or more calls to a MAF API (such as the MAF API 325 shown in FIGS. 3, 4, and 7). In some examples, completing the initialization of the MAF includes establishing (and/or confirming the ability to establish) a communication session between the MAF and a buffer API (such as the buffer API 335 shown in FIGS. 3, 4, and 7). Completing the initialization of the MAF can also include establishing (and/or confirming the ability to establish) communication sessions between the MAF and one or more media sources or media source locations, in some examples using one or more of the plugins initialized at the MAF as described above with respect to block 808. The media sources and media source locations can include, but are not limited to, remote or networked locations (such as cloud services or platforms), local storage (such as disk storage, solid-state storage, disk and other removable storage, etc.), and/or peer connectivity, etc.

At block 812, the process 800 includes creating one or more media pipelines. In one illustrative example, the one or more media pipelines include the media pipelines 372,374 (shown in FIG. 3), the media pipelines 572-578 (shown in FIG. 5), the media pipelines 672,674 (shown in FIG. 6), and/or the buffer pipelines 770 (shown in FIG. 7). The media pipelines can include one or more internal decoding and/or processing operations/operators, which can be applied to one or more tracks or media objects provided as input to a given media pipeline (e.g., retrieved by the MAF from a media source location and then provided to the given media pipeline as input). The media pipelines can provide output into one or more output buffers, which can provide storage of processed media objects that were requested by the presentation engine and can provide the presentation engine with access to the processed media objects. In some examples, the media pipelines can be created for each media object that is requested by the presentation engine or otherwise identified in a MAF API call as needing to be placed in an output buffer(s) at a certain time and/or in a certain requested format.

At block 812, the process 800 includes initializing one or more media pipelines and buffers. In one illustrative example, initializing the media pipelines includes the initialize( ) function shown in Table 1, and/or initializing the buffers includes the allocate( ) function shown in Table 4. The buffers can include output buffers, which are used to exchange processed media objects between the MAF and the presentation engine and can include one or more intermediate buffers. Intermediate buffers can be created within a media pipeline in order to support one or more decoding, processing, or other operations performed on a media object by the media pipeline prior to outputting a final, processed media object to the output buffers. In some examples, one or more of the output buffers can be initialized to be contained within a media pipeline. In some examples, one or more of the output buffers can be initialized to be external to a media pipeline. In one illustrative example, the buffers can include one or more of the buffers 332a-n (shown in FIG. 3), the buffers 432a-e (shown in FIG. 4), the buffers 532 (shown in FIG. 5), the buffers 632 and 634a-d (shown in FIG. 6), and/or the buffers 736 and/or 732a-c (shown in FIG. 7). Initializing a media pipeline can be performed for a media pipeline that was newly created (e.g., a MAF API call made by the presentation engine provides parameters for initializing media pipelines for requested media objects; the MAF creates each media pipeline and using the parameters from the MAF API call to initialize each media pipeline). Initializing a media pipeline can be performed for a media pipeline that was previously created, or otherwise already existed and/or was in use (e.g., a MAF API call made by the presentation engine can provide parameters for initializing media pipelines that already exist; the parameters can include an identifier of each existing media pipeline, which the MAF can use to subsequently reconfigure or initialize the existing media pipeline based on the parameters received in the MAF API call).

At block 816, the process 800 includes starting media fetching for each pipeline. In one illustrative example, media fetching can include the startFetching( ) function of Table 1. For example, after the initialization of the media pipelines and/or buffers at block 814, a given media pipeline can be set to a "READY" state. In response to a "READY" state, process 800 can in some examples move to block 816 to start media fetching for each pipeline that is in the "READY" state. Each media pipeline can perform a discrete media fetching operation, e.g., for specific one(s) of the requested media objects identified by the presentation engine's MAF API call.

At block 818, the process 800 includes setting an "ACTIVE" state for each media pipeline that is performing media fetching. In one example, the "ACTIVE" state can be set once the pipeline begins receiving as input a requested media object retrieved by the MAF from a media source location. In one example, the "ACTIVE" state can be set for a media pipeline once the presentation engine and/or MAF has transmitted a request (e.g., using the startFetching( ) function of Table 1) for the media pipeline to begin fetching, even if fetching has not yet begun.

At block 820, the process 800 includes starting a render loop at the presentation engine. In one example, the presentation engine can start the render loop by accessing one or more output buffers to obtain previously requested media objects for rendering a media scene. In some cases, a MAF API call can correspond to a specific render loop, e.g., the MAF API can identify some or all of the media objects needed by the presentation engine to perform a given render loop. In some examples, one or more of the render loops performed by the presentation engine can be timed, e.g., a render loop can be associated with a specific start time, and the MAF can perform a scheduling and pipeline management process such that the appropriate media pipelines and buffers are all created, initialized, and triggered to start fetching at an earlier enough time to ensure that processed media objects are delivered to the output buffers at or before the render loop start time. In some examples, the presentation engine can request the MAF to provide processed media objects to the output buffers with some offset from the render loop start time. For example, the presentation engine could specify in the MAF API call, or as a default/pre-determined parameter, that processed media objects are to be provided to the output buffers at least 500 milliseconds prior to the start time (other amounts of time can also be specified, e.g., between 50 milliseconds and 3 seconds). In some examples, the presentation engine can include individual delivery time requirements or deadlines for one or more requested media objects. For example, the presentation engine can include in the MAF API call an additional parameter to specify a delivery time for a requested media object.

At block 822, the process 800 includes performing the render loop started at block 820 by iterating through the media objects contained in the output buffers provided by the MAF to the presentation engine. In one illustrative example, iterating through the media objects can be based on the MPEG-I scene description and/or the presentation engine's parsing of the MPEG-I scene description (e.g., the parsing performed at blocks 804 and/or 806). From the scene description, the presentation engine determines each media object that is to be rendered for the render loop. For each media object, the presentation engine can iterate through its constituent attributes or media elements (which can themselves be media objects). The presentation engine can then fetch a processed frame for each attribute by accessing and reading from one or more corresponding output buffers. The processed frames can be obtained from the processed media elements provided to the output buffer(s) by the media pipelines initialized by the MAF. In some examples, the presentation engine can determine the corresponding output buffer(s) for a given frame because the presentation engine's MAF API call(s) specified the output buffer(s) for each requested media object. In some examples, the render loop can proceed after the frame fetching described above to the presentation engine binding attribute data and rendering each object of the render loop.

FIG. 9 is a flow diagram illustrating an example of a process 900 for processing media content. At block 902, the process 900 can include obtaining media information and buffer information for a media object determined from a scene description for at least one media scene. In some examples, the media information can identify an expected format for storing the media object in one or more output buffers of a media pipeline. In some cases, the buffer information can include one or more attributes of the one or more output buffers. The media scene can comprise one or more immersive media objects, which can include (but are not limited to), a three-dimensional (3D) mesh object, a 3D point cloud object, a virtual reality (VR) object, an augmented reality (AR) object, and a 6 Degrees-of-Freedom (DoF) object. In some cases, the media information can include one or more source locations for obtaining the media object and/or the media information can identify one or more presentation parameters for playback of the media object from the one or more output buffers. In some examples, the buffer information comprises a buffer list, with each entry of the buffer list comprising at least a buffer identifier (e.g., where the buffer identifier is associated with one or more buffer attributes for the buffer that is identified by the buffer identifier). In some cases, the media information and/or buffer information can be obtained for a media component that is part of a larger media object (e.g., a media object that includes multiple media components). In some examples, the media information can include the MediaInfo, such as described with respect to Tables 2 and 3. In some examples, the buffer information can include the BufferInfo, such as described with respect to Tables 2, 3, 5, and 6.

In one illustrative example, a presentation engine can be used to obtain the media information and buffer information based on parsing the scene description for the at least one media scene. The presentation engine can include the presentation engine 340 (shown in FIG. 3), the presentation engine 440 (shown in FIG. 4), the presentation engine 540 (shown in FIG. 5), the presentation engine 640 (shown in FIG. 6), the presentation engine 740 (shown in FIG. 7), and/or other presentation engine. In some examples, the presentation engine can be used to render, present, or otherwise display a 3D media scene or an immersive media scene that is described at least in part by the scene description (and/or subsequent scene updates). In some examples, the scene description can be an MPEG-I scene description file or document, and/or the scene description file can be based on the glTF 2.0 format. The scene description can include the scene description document 348 shown in FIG. 3 and/or the scene description and scene update documents shown in FIG. 4.

In some examples, parsing the scene description file and obtaining the media information and buffer information can be performed by the presentation engine upon initial receipt or retrieval of the scene description file. In some cases, the scene description file can be parsed in an ongoing fashion in which the presentation engine parses the scene description document to obtain media information and/or buffer information as needed to generate one or more calls to a MAF API and/or a buffer API. In one illustrative example, the MAF API can include the MAF API 325 shown in FIGS. 3, 4, and 7, and the buffer API can include the buffer API 335 shown in FIGS. 3, 4, and 7. The MAF API can be used to provide a communicative interface to a MAF (e.g., a Media Access Function) and or to control a MAF. The MAF can include the MAF 320 (shown in FIG. 3), the MAF 420 (shown in FIG. 4), and/or the MAF 720 (shown in FIG. 7). In some cases, the MAF and the presentation engine can be provided at a same local media playback system or device. In some cases, the MAF and the presentation engine can be provided separately.

At block 904, the process 900 can include initializing the media pipeline for the media object, based on the media information and/or the buffer information. In one illustrative example, the media pipeline can include one or more of the media pipelines 372,374 (shown in FIG. 3), the media pipelines 572-578 (shown in FIG. 5), the media pipelines 672,674 (shown in FIG. 6), and/or the buffer pipelines 770 (shown in FIG. 7). Initializing the media pipeline can include providing the media information and/or the buffer information as parameters of one or more MAF API calls made for the media object of the scene description. For example, the media information can include one or more source locations for obtaining the media object. In some examples, initializing the media pipeline can include initializing one or more plugins and/or obtaining and configuring one or more plugins, such that the media pipeline and/or the plugin(s) used by the media pipeline are configured as needed. The plugins can include protocol plugins (such as protocol plugin 423 shown in FIG. 4), format plugins (such as format plugin 427 shown in FIG. 4), and/or MAF plugins to a presentation engine (such as MAF plugin 443 shown in FIG. 4). In some examples, the plugins initialized at or for the MAF can include one or more of the media access plugins 702-706 shown in FIG. 7.

The media pipeline can provide output into one or more output buffers, which can provide storage of processed media objects that were requested by the presentation engine. In some cases, the one or more output buffers can provide the presentation engine with access to the processed media objects. In some examples, a media pipeline can be created for each media object or media component that is requested by the presentation engine or otherwise identified in a MAF API call as needing to be placed in an output buffer(s) at a certain time and/or in a certain requested format. In one illustrative example, initializing the media pipeline can include using the initialize( ) function shown in Table 1. In some cases, initializing the media pipeline can further include initializing one or more buffers, e.g., using the allocate( ) function shown in Table 4.

In some examples, initializing the media pipeline can be performed for a media pipeline that was newly created (e.g., a MAF API call made by the presentation engine provides parameters for initializing media pipelines for requested media objects; the MAF creates each media pipeline and using the parameters from the MAF API call to initialize each media pipeline). In some examples, initializing the media pipeline can be performed for a media pipeline that was previously created, or otherwise already existed and/or was in use (e.g., a MAF API call made by the presentation engine can provide parameters for initializing media pipelines that already exist; the parameters can include an identifier of each existing media pipeline, which the MAF can use to subsequently reconfigure or initialize the existing media pipeline based on the parameters received in the MAF API call). Initializing the media pipeline can include allocating a new buffer in response to a determination that a buffer identifier (e.g., determined from the buffer information, MAF API calls, and/or buffer API calls) does not belong to any of the existing buffers. Allocating a new buffer can subsequently be performed, based on one or more buffer attributes associated with the buffer identifier.

At block 906, the process 900 can include obtaining the media object in a delivery format. In one illustrative example, the media pipeline can be used to obtain the media object from a media source or media source location, e.g., where the delivery format is the format in which the media source provides the media object to the media pipeline. The media sources and media source locations can include, but are not limited to, remote or networked locations (such as cloud services or platforms), local storage (such as disk storage, solid-state storage, disk storage and other removable storage, etc.), and/or peer connectivity, etc. In some cases, one or more of the media sources and/or media source locations can be identified in the media information using at least one of a Universal Resource Locator (URL), a Uniform Resource Identifier (URI), and a local file path. In some cases, the media information can identify multiple media source locations, with the multiple media source locations comprising a default media source location and one or more alternative media source locations that are different from the default media source location. In some examples, when multiple media source locations are identified, a selected source location can be determined by using one or more selection factors to select amongst the multiple media source locations. The selection factors can include, but are not limited to, one or more of playback preferences, playback capabilities, and network characteristics. In some examples, the media object can be obtained from a source location that is selected based on view information that is determined from the one or more MAF API calls. The view information can include a position of the media object relative to a viewer position. In some cases, the view information can be used to configure a selected source location for obtaining the media object. For example, the view information can be used to adjust a level of detail of the media object (e.g., higher or lower resolution), to adjust a bitrate of the media object, and/or to adjust a portion or the parts of the obtained media object that is visible.

In one illustrative example, obtaining the media object can include starting media fetching for the media pipeline. For example, media fetching can be performed using the startFetching( ) function of Table 1. In some cases, after the initialization of the media pipeline but before starting media fetching, the media pipeline can be set to a "READY" state. In response to a "READY" state, media fetching can begin. Each media pipeline can perform a discrete media fetching operation, e.g., for specific one(s) of the requested media objects and/or media components identified by the presentation engine's MAF API call. After starting media fetching to obtain the media object, the process 900 can include setting an "ACTIVE" state for each media pipeline that is performing media fetching. In one example, the "ACTIVE" state can be set once the pipeline begins receiving as input a requested media object, e.g., a media object retrieved by the MAF from a media source location. In one example, the "ACTIVE" state can be set for the media pipeline once the presentation engine and/or MAF have transmitted a request (e.g., using the startFetching( ) function of Table 1) for the media pipeline to begin fetching, even if fetching has not yet begun.

In some cases, at block 906, the process 900 can further include generating one or more processed media objects at least in part by processing the obtained media object, such that each processed media object (e.g., of the one or more processed media objects) is converted from the delivery format to the expected format for storing each processed media object in an output buffer of the one or more output buffers. In one illustrative example, the media pipeline can include one or more internal decoding and/or processing operations/operators, which can be applied to one or more tracks, media objects, and/or media components provided as input to the media pipeline (e.g., retrieved by the MAF from a media source location and then provided to the given media pipeline as input). The expected format for storing each processed media object in an output buffer can be specified by a MAF API call and/or a buffer API call generated by the presentation, e.g., based on the media information and/or the buffer information, respectively. In some cases, the expected format can be specified or determined by the presentation engine, for example based on one or more settings, preferences, or configurations. In some cases, the expected format for delivery or a processed media object to one or more output buffers can be obtained by the presentation engine based on the parsing of the scene description document associated with the media object.

At block 908, the process 900 can include outputting the one or more processed media objects to the one or more output buffers using the initialized media pipeline. In one illustrative example, the buffers can include output buffers, which are used to exchange processed media objects between the MAF and the presentation engine. In some cases, the buffers can include at least one circular buffer. The buffers can be controlled by passing the buffer information via one or more calls to the buffer API. In some cases, the buffers can include one or more intermediate buffers. Intermediate buffers can be created within a media pipeline in order to support one or more decoding, processing, or other operations performed on a media object by the media pipeline prior to outputting a final, processed media object to the output buffers. In some examples, one or more of the output buffers can be initialized to be contained within a media pipeline. In some examples, one or more of the output buffers can be initialized to be external to a media pipeline. In one illustrative example, the buffers can include one or more of the buffers 332a-n (shown in FIG. 3), the buffers 432a-e (shown in FIG. 4), the buffers 532 (shown in FIG. 5), the buffers 632 and 634a-d (shown in FIG. 6), and/or the buffers 736 and/or 732a-c (shown in FIG. 7).

In some examples, the processes described herein (e.g., process 800, process 900, and/or any other process described herein) may be performed by a computing device, apparatus, or system. In one example, the process 800 and/or the process 900 can be performed by a computing device or system having the computing device architecture 1200 of FIG. 12. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 800, process 900, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800, process 900, and/or any other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800, process 900, and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As noted above, a decoder (or decoding device) can be used to decode video data, such as by performing the decoding operation(s) 582 shown in FIG. 5. Examples of decoders including the HEVC decoder 682a, the HEVC decoder 682b, the HEVC decoder 682c, and the patch decoder 682d. Other examples of decoders include decoders configured to decode data encoded according to the Versatile Video Coding (VVC) Standard, the Advanced Video Coding (AVC) Standard, the Alliance for Open Media (AOMedia) Video 1 (AV1) format, among others.

Figure 10:
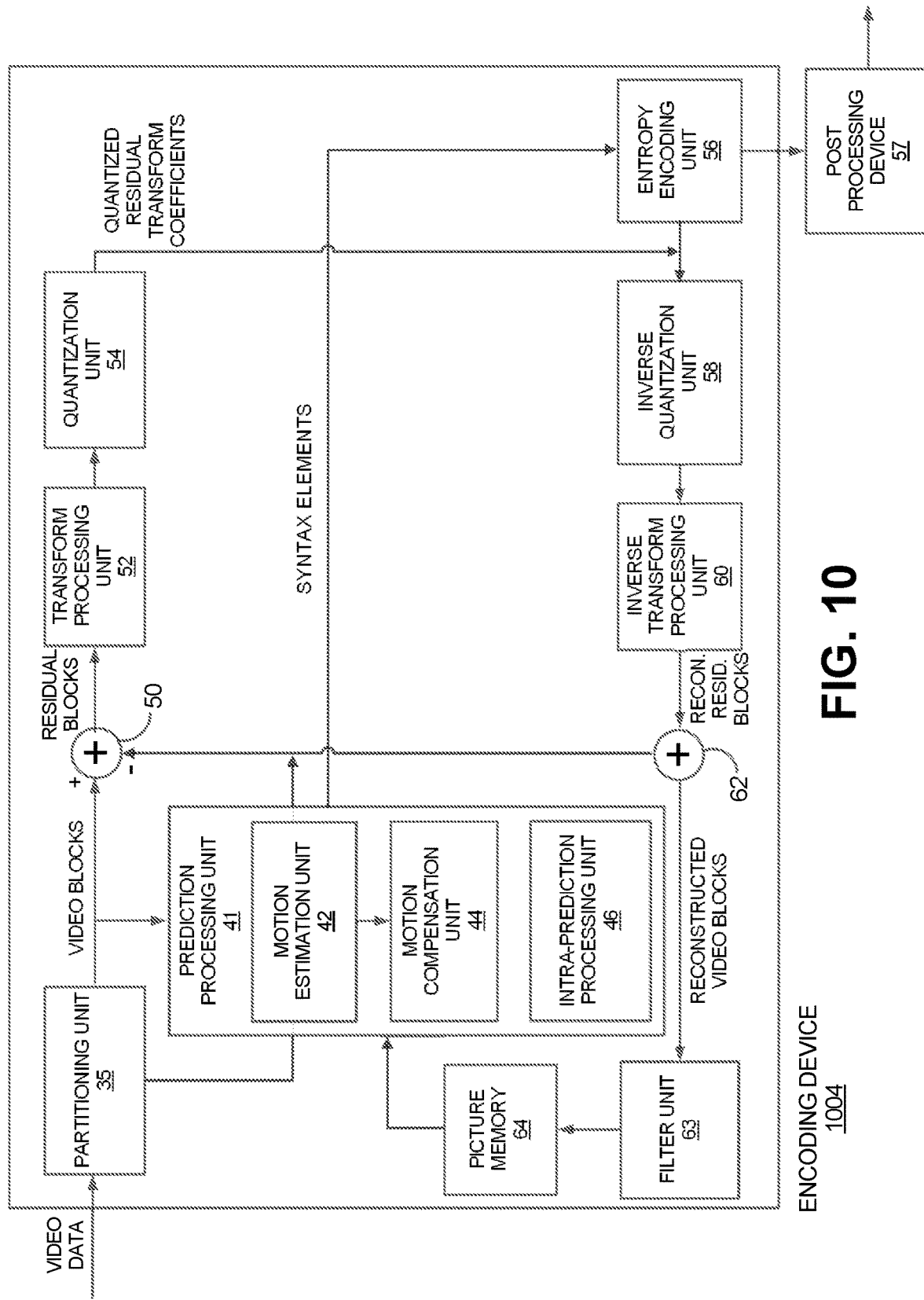
FIG. 10 is a block diagram illustrating an example of a video encoding device, in accordance with some examples.
Figure 11:
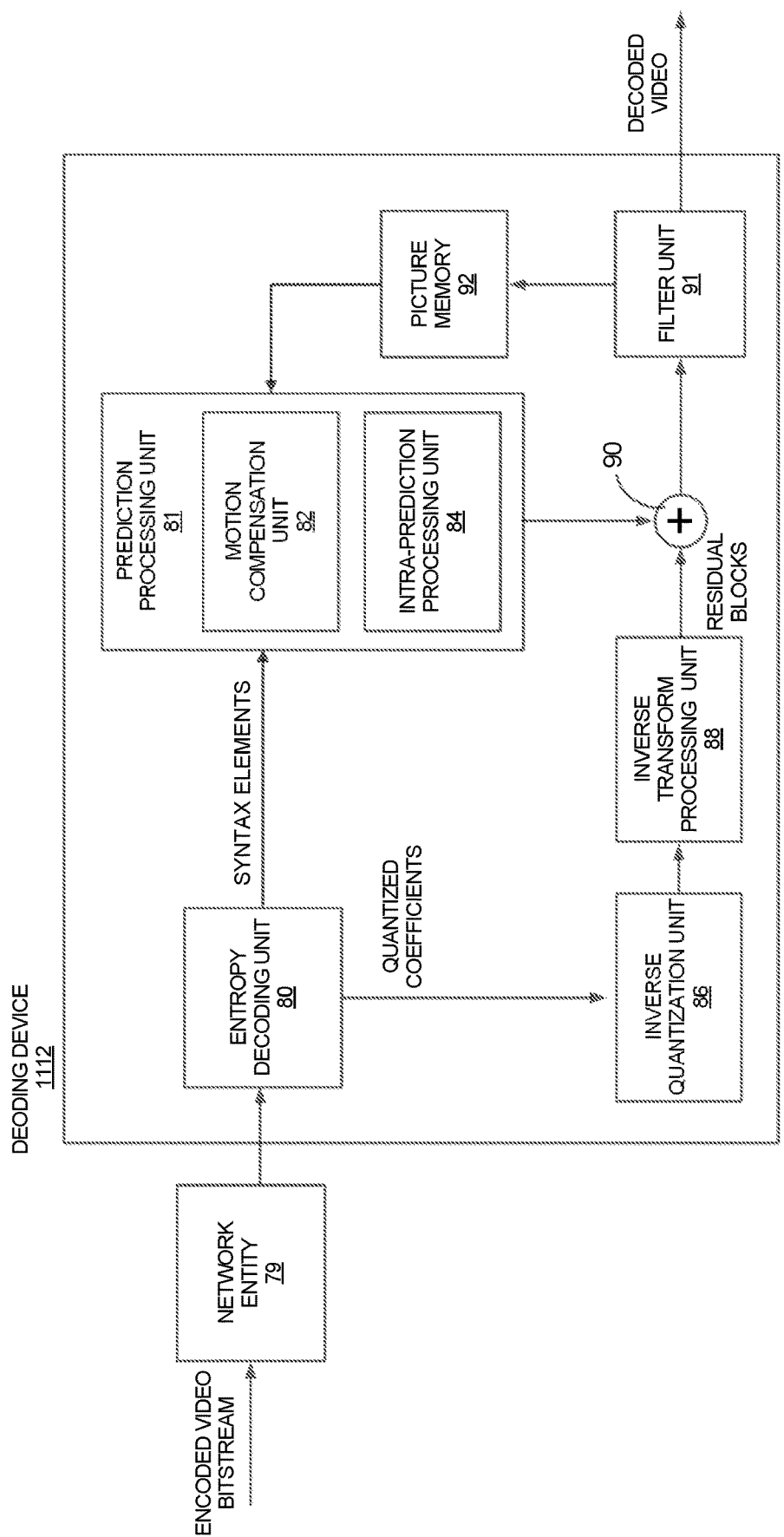
FIG. 11 is a block diagram illustrating an example of a video decoding device, in accordance with some examples.

Details of an example encoding device 1004 and decoding device 1112 are shown in FIG. 10 and FIG. 11, respectively. FIG. 10 is a block diagram illustrating an example encoding device 1004 that may implement one or more of the techniques described in this disclosure. Encoding device 1004 may, for example, generate the syntax structures described herein (e.g., the syntax structures of a Video Parameter Set (VPS), a Sequence Parameter Set (SPS), a Picture Parameter Set (PPS), and/or other syntax elements). Encoding device 1004 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 1004 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 1004 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 10 as being an in loop filter, in other configurations, filter unit 63 may be implemented as a post loop filter. A post processing device 57 may perform additional processing on encoded video data generated by the encoding device 1004. The techniques of this disclosure may in some instances be implemented by the encoding device 1004. In other instances, however, one or more of the techniques of this disclosure may be implemented by post processing device 57.

As shown in FIG. 10, the encoding device 1004 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 1004 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference (or image sample difference), which may be determined by sum of absolute difference (SAD), sum of square difference (SSD), or other difference metrics. In some examples, the encoding device 1004 may calculate values for sub-integer pixel positions of reference pictures stored in picture memory 64. For example, the encoding device 1004 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 1004 forms a residual video block by subtracting pixel values (or image sample values) of the predictive block from the pixel values of the current video block being coded, forming pixel difference values (or image sample difference values). The pixel difference values (or image sample difference values) form residual data for the block, and may include both luma and chroma difference components. Summer 50 represents the component or components that perform this subtraction operation. Motion compensation unit 44 may also generate syntax elements associated with the video blocks and the video slice for use by the decoding device 1112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 1004 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 1004 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 1112, or archived for later transmission or retrieval by the decoding device 1112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values (or image sample values) for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 1004 of FIG. 10 represents an example of a video encoder configured to perform any of the techniques described herein.

FIG. 11 is a block diagram illustrating an example decoding device 1112. The decoding device 1112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 1112 may, in some examples, perform a decoding pass generally reciprocal to the encoding pass described with respect to the encoding device 1004 from FIG. 10.

During the decoding process, the decoding device 1112 receives an encoded video bitstream that represents video blocks of an encoded video slice and associated syntax elements sent by the encoding device 1004. In some embodiments, the decoding device 1112 may receive the encoded video bitstream from the encoding device 1004. In some embodiments, the decoding device 1112 may receive the encoded video bitstream from a network entity 79, such as a server, a media-aware network element (MANE), a video editor/splicer, or other such device configured to implement one or more of the techniques described above. Network entity 79 may or may not include the encoding device 1004. Some of the techniques described in this disclosure may be implemented by network entity 79 prior to network entity 79 transmitting the encoded video bitstream to the decoding device 1112. In some video decoding systems, network entity 79 and the decoding device 1112 may be parts of separate devices, while in other instances, the functionality described with respect to network entity 79 may be performed by the same device that comprises the decoding device 1112.

The entropy decoding unit 80 of the decoding device 1112 entropy decodes the bitstream to generate quantized coefficients, motion vectors, and other syntax elements. Entropy decoding unit 80 forwards the motion vectors and other syntax elements to prediction processing unit 81. The decoding device 1112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 1112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 1004 during encoding of the video blocks to calculate interpolated values for sub-integer pixels of reference blocks. In this case, motion compensation unit 82 may determine the interpolation filters used by the encoding device 1004 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 1004 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 1112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 11 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device.

In this manner, the decoding device 1112 of FIG. 11 represents an example of a video decoder configured to perform any of the techniques described herein.

Figure 12:
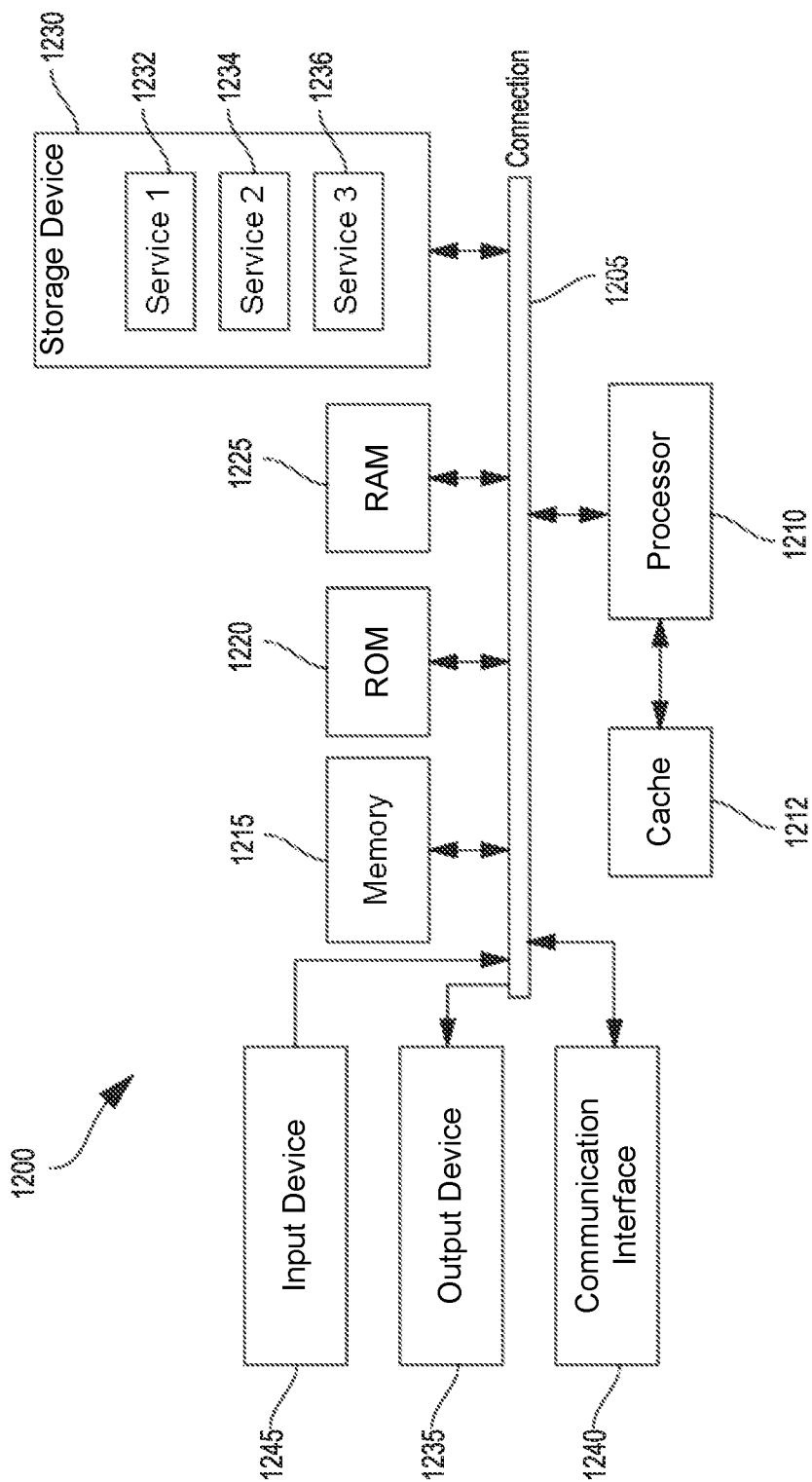
FIG. 12 is a diagram illustrating an example system architecture for implementing certain aspects described herein.

FIG. 12 illustrates an example computing device architecture 1200 of an example computing device which can implement various techniques described herein. For example, the computing device architecture 1200 can implement at least some portions of the media system 300 shown in FIG. 3. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service (e.g., service 1 1232, service 2 1234, and service 3 1236) stored in storage device 1230 and configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device. In some instances, multimodal computing devices can enable a user to provide multiple types of input to communicate with the computing device architecture 1200. The communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include service 1232, service 1234, and service 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: A method of processing media content, the method comprising: obtaining media information and buffer information for a media object determined from a scene description for at least one media scene, wherein the media information identifies an expected format for storing the media object in one or more output buffers of a media pipeline, and wherein the buffer information includes one or more attributes of the one or more output buffers; initializing the media pipeline for the media object based on the media information and the buffer information; obtaining the media object in a delivery format; generating one or more processed media objects at least in part by processing the obtained media object, wherein each processed media object of the one or more processed media objects is converted from the delivery format to the expected format for storing each processed media object in an output buffer of the one or more output buffers; and outputting the one or more processed media objects to the one or more output buffers using the initialized media pipeline.

Aspect 2: The method of aspect 1, wherein the media information and the buffer information are provided as parameters of a Media Access Function (MAF) Application Programming Interface (API) call made for the media object of the scene description.

Aspect 3: The method of any one of aspects 1 or 2, wherein the media information includes one or more source locations for obtaining the media object.

Aspect 4: The method of any one of aspects 1 to 3, wherein the media information identifies one or more presentation parameters for playback of the media object from the one or more output buffers.

Aspect 5: The method of aspect 2, wherein the media pipeline is initialized using one or more calls to the MAF API.

Aspect 6: The method of aspect 5, wherein the media object is obtained from a source location selected based on view information determined from the one or more MAF API calls.

Aspect 7: The method of any one of aspects 5 or 6, wherein the view information determined from the one or more MAF API calls includes a position of the media object relative to a viewer position.

Aspect 8: The method of any one of aspects 5 to 7, further comprising: configuring the source location based on the view information; wherein the configuring comprises one or more of adjusting a level of detail of the obtained media object, adjusting a bitrate of the obtained media object, and adjusting a portion of the obtained media object that is visible.

Aspect 9: The method of any one of aspects 5 to 8, further comprising controlling each output buffer of the one or more output buffers at least in part by passing the buffer information to a buffer Application Programming Interface (API) using the one or more calls to the buffer API.

Aspect 10: The method of any one of aspects 1 to 9, wherein initializing the media pipeline comprises allocating a new buffer in response to a determination that a buffer identifier does not belong to an existing buffer, the allocating being based on one or more buffer attributes associated with the buffer identifier.

Aspect 11: The method of aspect 10, wherein the buffer information comprises a buffer list, each entry of the buffer list including a respective buffer identifier and being associated with the one or more buffer attributes.

Aspect 12: The method of any one of aspects 1 to 11, wherein the one or more output buffers include at least one circular buffer.

Aspect 13: The method of any one of aspects 1 to 12, wherein the scene description includes a Graphics Language Transmission Format (glTF) scene description.

Aspect 14: The method of any one of aspects 1 to 13, wherein the at least one media scene comprises one or more immersive media objects, the one or more immersive media objects including at least one of a three-dimensional (3D) mesh object, a 3D point cloud object, a virtual reality (VR) object, an augmented reality (AR) object, and a 6 Degrees-of-Freedom (DoF) object Aspect 15: The method of any one of aspects 1 to 14, wherein the media object is obtained in the delivery format from a source location selected from one or more source locations identified in the media information.

Aspect 16: The method of aspect 15, wherein the one or more source locations are identified in the media information using at least one of a Universal Resource Locator (URL), a Uniform Resource Identifier (URI), and a local file path.

Aspect 17: The method of any one of aspects 15 or 16, wherein the one or more source locations identified in the media information comprise a default media source location and one or more alternative media source locations different from the default media source location.

Aspect 18: The method of any one of aspects 15 to 17, wherein the selected source location is determined based on one or more selection factors identified in the media information, the one or more selection factors comprising one or more of playback preferences, playback capabilities, and network characteristics.

Aspect 19: An apparatus for processing media content, comprising: a memory; and a processor coupled to the memory, the processor configured to: obtain media information and buffer information for a media object determined from a scene description for at least one media scene, wherein the media information identifies an expected format for storing the media object in one or more output buffers of a media pipeline, and wherein the buffer information includes one or more attributes of the one or more output buffers; initialize the media pipeline for the media object based on the media information and the buffer information; obtain the media object in a delivery format; generate one or more processed media objects at least in part by processing the obtained media object, wherein each processed media object of the one or more processed media objects is converted from the delivery format to the expected format for storing each processed media object in an output buffer of the one or more output buffers; and output the one or more processed media objects to the one or more output buffers using the initialized media pipeline.

Aspect 20: The apparatus of aspect 19, wherein the media information and the buffer information are provided as parameters of a Media Access Function (MAF) Application Programming Interface (API) call made for the media object of the scene description.

Aspect 21: The apparatus of any one of aspects 19 or 20, wherein the media information includes one or more source locations for obtaining the media object.

Aspect 22: The apparatus of any one of aspects 19 to 21, wherein the media information identifies one or more presentation parameters for playback of the media object from the one or more output buffers.

Aspect 23: The apparatus of aspect 20, wherein the media pipeline is initialized using one or more calls to the MAF API.

Aspect 24: The apparatus of aspect 23, wherein the media object is obtained from a source location selected based on a view information determined from the one or more MAF API calls.

Aspect 25: The apparatus of aspect 24, wherein the view information determined from the one or more MAF API calls includes a position of the media object relative to a viewer position.

Aspect 26: The apparatus of any one of aspects 24 or 25, wherein the processor is configured to: configure the source location based on the view information; wherein the configuring comprises one or more of adjusting a level of detail of the obtained media object, adjusting a bitrate of the obtained media object, and adjusting a portion of the obtained media object that is visible.

Aspect 27: The apparatus of any one of aspects 23 to 26, wherein the processor is configured to control each output buffer of the one or more output buffers at least in part by passing the buffer information to a buffer Application Programming Interface (API) using the one or more calls to the buffer API.

Aspect 28: The apparatus of any one of aspects 19 to 27, wherein, to initialize the media pipeline, the processor is configured to allocate a new buffer in response to a determination that a buffer identifier does not belong to an existing buffer, the allocating being based on one or more buffer attributes associated with the buffer identifier.

Aspect 29: The apparatus of aspect 28, wherein the buffer information comprises a buffer list, each entry of the buffer list including a respective buffer identifier and being associated with the one or more buffer attributes.

Aspect 30: The apparatus of any one of aspects 19 to 29, wherein the one or more output buffers include at least one circular buffer.

Aspect 31: The apparatus of any one of aspects 19 to 30, wherein the scene description includes a Graphics Language Transmission Format (glTF) scene description.

Aspect 32: The apparatus of any one of aspects 19 to 31, wherein the at least one media scene comprises one or more immersive media objects, the one or more immersive media objects including at least one of a three-dimensional (3D) mesh object, a 3D point cloud object, a virtual reality (VR) object, an augmented reality (AR) object, and a 6 Degrees-of-Freedom (DoF) object.

Aspect 33: The apparatus of any one of aspects 19 to 32, wherein the media object is obtained in the delivery format from a source location selected from one or more source locations identified in the media information.

Aspect 34: The apparatus of aspect 33, wherein the one or more source locations are identified in the media information using at least one of a Universal Resource Locator (URL), a Uniform Resource Identifier (URI), and a local file path.

Aspect 35: The apparatus of any one of aspects 33 or 34, wherein the one or more source locations identified in the media information comprise a default media source location and one or more alternative media source locations different from the default media source location.

Aspect 36: The apparatus of any one of aspects 33 to 35, wherein the selected source location is determined based on one or more selection factors identified in the media information, the one or more selection factors comprising one or more of playback preferences, playback capabilities, and network characteristics.

Aspect 37: A non-transitory computer-readable storage medium having stored thereon instructions which, when executed by one or more processors, cause the one or more processors to perform any of the operations of aspects 1 to 36.

Aspect 38: An apparatus comprising means for performing any of the operations of aspects 1 to 36.

What is claimed is:

1. A method of processing media content, the method comprising:
   obtaining media information and buffer information for a media object determined from a scene description for at least one media scene, wherein the media information identifies an expected format for storing the media object in one or more output buffers of a media pipeline, wherein the buffer information includes one or more attributes of the one or more output buffers, and wherein the media information and the buffer information are provided as parameters of a Media Access Function (MAF) Application Programming Interface (API) call made for the media object of the scene description;
   initializing the media pipeline for the media object based on the media information and the buffer information, wherein the media pipeline is initialized using one or more calls to the MAF API;
   obtaining the media object in a delivery format;
   generating one or more processed media objects at least in part by processing the obtained media object, wherein each processed media object of the one or more processed media objects is converted from the delivery format to the expected format for storing each processed media object in an output buffer of the one or more output buffers;
   outputting the one or more processed media objects to the one or more output buffers using the initialized media pipeline, wherein the one or more output buffers are controlled at least in part by passing the buffer information to a buffer Application Programming Interface (API) using the one or more calls to the buffer API.

2. The method of claim 1, wherein the media information includes one or more source locations for obtaining the media object.

3. The method of claim 1, wherein the media information identifies one or more presentation parameters for playback of the media object from the one or more output buffers.

4. The method of claim 1, wherein the media object is obtained from a source location selected based on view information determined from the one or more MAF API calls.

5. The method of claim 4, wherein the view information determined from the one or more MAF API calls includes a position of the media object relative to a viewer position.

6. The method of claim 4, further comprising:
   configuring the source location based on the view information;
   wherein the configuring comprises one or more of adjusting a level of detail of the obtained media object, adjusting a bitrate of the obtained media object, and adjusting a portion of the obtained media object that is visible.

7. The method of claim 1, wherein initializing the media pipeline comprises allocating a new buffer in response to a determination that a buffer identifier does not belong to an existing buffer, the allocating being based on one or more buffer attributes associated with the buffer identifier.

8. The method of claim 7, wherein the buffer information comprises a buffer list, each entry of the buffer list including a respective buffer identifier and being associated with the one or more buffer attributes.

9. The method of claim 1, wherein the one or more output buffers include at least one circular buffer.

10. The method of claim 1, wherein the scene description includes a Graphics Language Transmission Format (glTF) scene description.

11. The method of claim 1, wherein the at least one media scene comprises one or more immersive media objects, the one or more immersive media objects including at least one of a three-dimensional (3D) mesh object, a 3D point cloud object, a virtual reality (VR) object, an augmented reality (AR) object, and a 6 Degrees-of-Freedom (DoF) object.

12. The method of claim 1, wherein the media object is obtained in the delivery format from a source location selected from one or more source locations identified in the media information.

13. The method of claim 12, wherein the one or more source locations are identified in the media information using at least one of a Universal Resource Locator (URL), a Uniform Resource Identifier (URI), and a local file path.

14. The method of claim 12, wherein the one or more source locations identified in the media information comprise a default media source location and one or more alternative media source locations different from the default media source location.

15. The method of claim 12, wherein the selected source location is determined based on one or more selection factors identified in the media information, the one or more selection factors comprising one or more of playback preferences, playback capabilities, and network characteristics.

16. An apparatus for processing media content, comprising:
   a memory; and
   a processor coupled to the memory, the processor configured to:
      obtain media information and buffer information for a media object determined from a scene description for at least one media scene, wherein the media information identifies an expected format for storing the media object in one or more output buffers of a media pipeline, wherein the buffer information includes one or more attributes of the one or more output buffers, and wherein the media information and the buffer information are provided as parameters of a Media Access Function (MAF) Application Programming Interface (API) call made for the media object of the scene description;
      initialize the media pipeline for the media object based on the media information and the buffer information, wherein the media pipeline is initialized using one or more calls to the MAF API;
      obtain the media object in a delivery format;
      generate one or more processed media objects at least in part by processing the obtained media object, wherein each processed media object of the one or more processed media objects is converted from the delivery format to the expected format for storing each processed media object in an output buffer of the one or more output buffers; and
      output the one or more processed media objects to the one or more output buffers using the initialized media pipeline, wherein the one or more output buffers are controlled at least in part by passing the buffer information to a buffer Application Programming Interface (API) using the one or more calls to the buffer API.

17. The apparatus of claim 16, wherein the media information includes one or more source locations for obtaining the media object.

18. The apparatus of claim 16, wherein the media information identifies one or more presentation parameters for playback of the media object from the one or more output buffers.

19. The apparatus of claim 16, wherein the media object is obtained from a source location selected based on view information determined from the one or more MAF API calls.

20. The apparatus of claim 19, wherein the view information determined from the one or more MAF API calls includes a position of the media object relative to a viewer position.

21. The apparatus of claim 19, wherein the processor is configured to:
configure the source location based on the view information;
wherein the configuring comprises one or more of adjusting a level of detail of the obtained media object, adjusting a bitrate of the obtained media object, and adjusting a portion of the obtained media object that is visible.

22. The apparatus of claim 16, wherein, to initialize the media pipeline, the processor is configured to allocate a new buffer in response to a determination that a buffer identifier does not belong to an existing buffer, the allocating being based on one or more buffer attributes associated with the buffer identifier.

23. The apparatus of claim 22, wherein the buffer information comprises a buffer list, each entry of the buffer list including a respective buffer identifier and being associated with the one or more buffer attributes.

24. The apparatus of claim 16, wherein the one or more output buffers include at least one circular buffer.

25. The apparatus of claim 16, wherein the scene description includes a Graphics Language Transmission Format (glTF) scene description.

26. The apparatus of claim 16, wherein the at least one media scene comprises one or more immersive media objects, the one or more immersive media objects including at least one of a three-dimensional (3D) mesh object, a 3D point cloud object, a virtual reality (VR) object, an augmented reality (AR) object, and a 6 Degrees-of-Freedom (DoF) object.

27. The apparatus of claim 16, wherein the media object is obtained in the delivery format from a source location selected from one or more source locations identified in the media information.

28. The apparatus of claim 27, wherein the one or more source locations are identified in the media information using at least one of a Universal Resource Locator (URL), a Uniform Resource Identifier (URI), and a local file path.

29. The apparatus of claim 27, wherein the one or more source locations identified in the media information comprise a default media source location and one or more alternative media source locations different from the default media source location.

30. The apparatus of claim 27, wherein the selected source location is determined based on one or more selection factors identified in the media information, the one or more selection factors comprising one or more of playback preferences, playback capabilities, and network characteristics.

* * * * *